(12) United States Patent
Duginske

(10) Patent No.: US 7,930,960 B2
(45) Date of Patent: *Apr. 26, 2011

(54) UNIVERSAL MACHINERY FENCE SYSTEM

(75) Inventor: Mark A. Duginske, Merrill, WI (US)

(73) Assignee: Allen IP, Incorporated, Huxley, IA (US)

( * ) Notice: Subject to any disclaimer, the term of this patent is extended or adjusted under 35 U.S.C. 154(b) by 34 days.

This patent is subject to a terminal disclaimer.

(21) Appl. No.: 11/381,805

(22) Filed: May 5, 2006

(65) Prior Publication Data

US 2006/0248998 A1    Nov. 9, 2006

Related U.S. Application Data

(60) Provisional application No. 60/678,502, filed on May 6, 2005.

(51) Int. Cl.
*B26D 7/06* (2006.01)
*B26D 7/01* (2006.01)
*B27B 31/00* (2006.01)
*B23Q 3/00* (2006.01)

(52) U.S. Cl. ...... 83/438; 83/468.7; 144/253.1; 269/303; 269/305

(58) Field of Classification Search .............. 83/438, 83/448, 450, 467.1, 468, 468.7, 477.2; 269/303, 269/304, 315; 144/253.1
See application file for complete search history.

(56) References Cited

U.S. PATENT DOCUMENTS

| | | | |
|---|---|---|---|
| 1,285,628 A | 11/1918 | Craley | |
| 1,994,422 A | 3/1935 | Sasek | |
| 2,260,708 A | 10/1941 | French | |
| 2,285,897 A | 6/1942 | Campbell | |
| 2,787,301 A | 4/1957 | Anderson | |
| 3,827,686 A | 8/1974 | Storkh | |
| 3,994,484 A | 11/1976 | Schorr | |

(Continued)

OTHER PUBLICATIONS

Laguna Tools, Webpage at www.lagunatools.com/LM410.htm, LM410 Combination Machine, Printed Jan. 6, 2003, (2 pages).

(Continued)

*Primary Examiner* — Ghassem Alie
*Assistant Examiner* — Bharat C Patel

(57) ABSTRACT

A universal machinery fence system includes an L-shaped fence or a box shaped fence and clamp block which clamps to a rail extrusion with a half dovetail on the front on the edge of a table saw, band saw, shaper, router table, mortiser, or other woodworking or metal working machines. A U-shaped front rail is provided for attaching the fence to the cast iron table of a table saw, shaper, or band saw. The band saw fence U-shaped rail is predrilled to fit the table fence mounting holes of the most popular 14" band saws. Optional extruded front rails are also provided for attaching the fence to shop made 0.750" tables such as used on a drill press. Also provided is a fence rail extrusion for mounting the fence on the front and back of the popular 1.125" size router table. An optional extruded front rail which is adjustable in height is also provided for attaching the fence to shop made tables between 0.750" and 1.5" in thickness. A re-saw guide fitted to the fence extrusion has a convex surface for supporting a workpiece on edge allowing the operator to easily adjust for blade drift. An optional micro-adjuster allows the fence to move accurately in small increments. A router table with holes and slots allows the fence to be used to guide the workpiece in the router table mode and then be used to guide the router or a saw on top of the workpiece.

28 Claims, 22 Drawing Sheets

U.S. PATENT DOCUMENTS

| | | | | |
|---|---|---|---|---|
| 4,062,123 | A * | 12/1977 | Lundquist | 409/130 |
| 4,256,000 | A | 3/1981 | Seidel | |
| 4,693,158 | A | 9/1987 | Price | |
| 4,747,330 | A | 5/1988 | Carithers, Jr. | |
| 4,817,693 | A | 4/1989 | Schuler | |
| 4,871,156 | A | 10/1989 | Kozyrski et al. | |
| 4,887,653 | A | 12/1989 | Thomas | |
| 5,018,562 | A * | 5/1991 | Adams | 144/253.1 |
| 5,038,486 | A | 8/1991 | Ducate, Sr. | |
| 5,063,983 | A | 11/1991 | Barry | |
| 5,155,556 | A | 10/1992 | Foanio | |
| 5,161,445 | A * | 11/1992 | Kozyrski et al. | 83/455 |
| 5,337,641 | A * | 8/1994 | Duginske | 83/468 |
| 5,388,337 | A | 2/1995 | Powers, II | |
| 5,443,554 | A | 8/1995 | Robert | |
| 5,490,665 | A | 2/1996 | Thiele et al. | |
| 5,553,644 | A | 9/1996 | Adams | |
| 5,608,970 | A | 3/1997 | Owen | |
| 5,617,909 | A | 4/1997 | Duginske | |
| 5,662,019 | A * | 9/1997 | Denman | 83/425 |
| 5,695,178 | A | 12/1997 | Lenzkes | |
| 5,716,045 | A | 2/1998 | Taylor | |
| 5,768,966 | A | 6/1998 | Duginske | |
| 5,836,365 | A * | 11/1998 | Derecktor | 144/287 |
| 5,845,555 | A * | 12/1998 | Dawley | 83/467.1 |
| 5,890,524 | A * | 4/1999 | Tucker et al. | 144/371 |
| 5,979,283 | A | 11/1999 | Osborne | |
| 6,061,921 | A * | 5/2000 | Adams et al. | 33/638 |
| 6,189,429 | B1 * | 2/2001 | Liu | 83/477 |
| 6,250,190 | B1 | 6/2001 | Ceroll et al. | 83/438 |
| 6,484,614 | B1 * | 11/2002 | Huang | 83/438 |
| 6,547,311 | B1 * | 4/2003 | Derecktor | 296/100.12 |
| 6,557,601 | B1 * | 5/2003 | Taylor | 144/253.1 |
| 6,851,243 | B1 * | 2/2005 | Sandford | 52/645 |
| 6,851,345 | B1 * | 2/2005 | Kennelly et al. | 83/438 |
| 6,880,442 | B2 | 4/2005 | Duginske | |
| 7,036,540 | B2 * | 5/2006 | Welsh et al. | 144/286.1 |
| 7,464,737 | B2 * | 12/2008 | Duginske | 144/253.1 |
| 2002/0194971 | A1 * | 12/2002 | Park et al. | 83/477.2 |
| 2005/0056345 | A1 | 3/2005 | Duginske | |
| 2005/0139056 | A1 * | 6/2005 | Gass et al. | 83/438 |

OTHER PUBLICATIONS

Martin Woodworking Machines Corp., Webpage www.martin-usa.com/t_slidingsaw.asp, Sliding Table Saw T 73, including T 73 Basic, T 73 Classic and T 73 CNC, Printed Jan. 8, 2003, (2 pages).

Festool USA Tooltechnic Systems, LLC, MFT 800/MFT1080 Table, Master Festool USA Catalog 2005, (3 pages).

Office Action dated Aug. 22, 2007 for U.S. Appl. No. 10/944,035, 7 pages.

U.S. Appl. No. 12/106,867, filed Apr. 21, 2008, entitled, "Insert Plate Leveling", Clark.

Office Action dated Apr. 4, 2008 for U.S. Appl. No. 10/944,035, 8 pages.

"Mechanical Engineers' Handbook", McGraw-Hill Book Company, Inc. 1958, Chapter 8, p. 134.

"Fine Woodworking", Remedy for a Worn Miter Gauge, Jul./Aug., No. 53, 1985, (3 pages).

"Fine Woodworking", Miter Gauges, Apr. 1992, (3 pages).

Applicant's Exhibit No. 1, front and back cover pages and pp. 72-85 and 166 of the "1992 Garrett Wade Tool Catalog", Garrett Wade Company, Inc.

Applicant's Exhibit No. 2. "Wood Werks Supply, Inc.", Vises, clamps saws, 3 pages, (admitted prior art).

Applicant's Exhibit No. 3, "Joiner's Edge High Precision T-Slot Extrusion Modular 3-in 2 Woodworking System", Schuler Toolworks, LTD., (1 pages), 1991.

Applicant's Exhibit No. 4, entitled "Farris Right Angle Gauge Lets You Make Perfect Miters of Any Angle", 1 page, (admitted prior art).

Applicant's Exhibit No. 5, entitled, "Miter Gauge with Holddown (and Adjustable Strap)", 2 pages, (admitted prior art).

Applicant's Exhibit No. 6, WoodsmithShop Catalog, "Adjustable Miter Fence", (2 pages, )1994.

Applicant's Exhibit No. 7,Vega Enterprises, Inc., "Vega Performance Miter Gage", (2 pages), Aug. 1994.

Notice of Allowance for U.S. Appl. No. 10/944,035 dated Aug. 8, 2008, (7 pages).

* cited by examiner

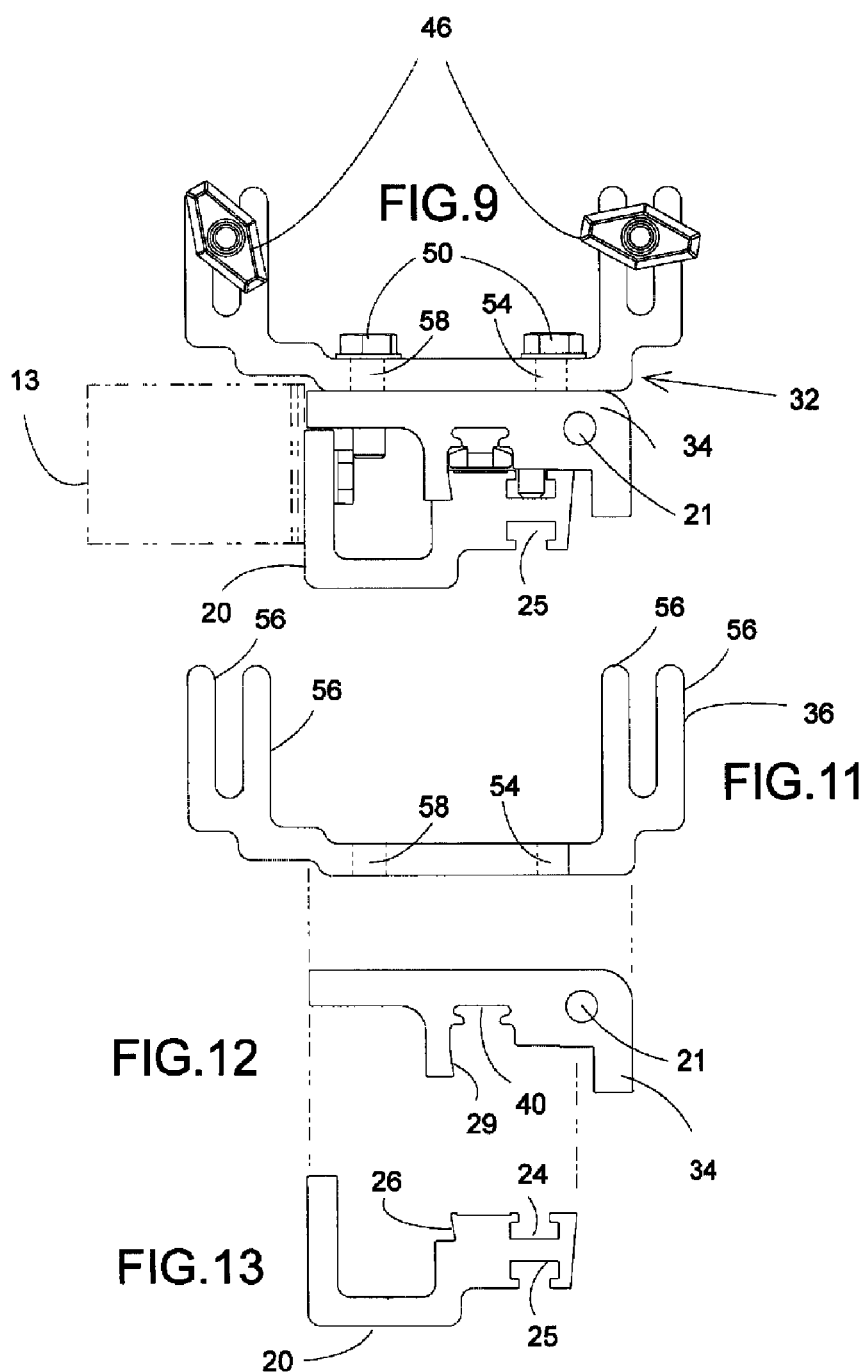

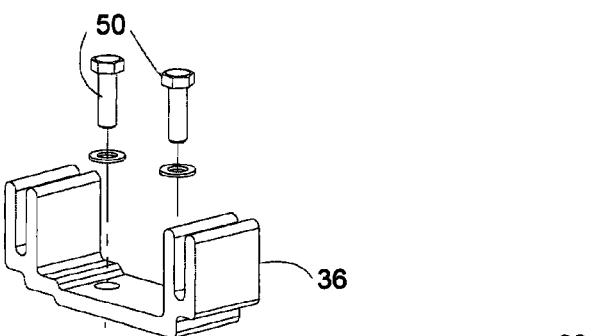
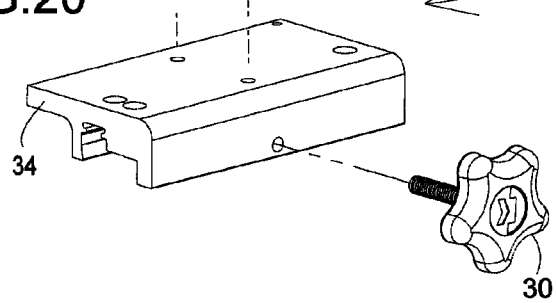
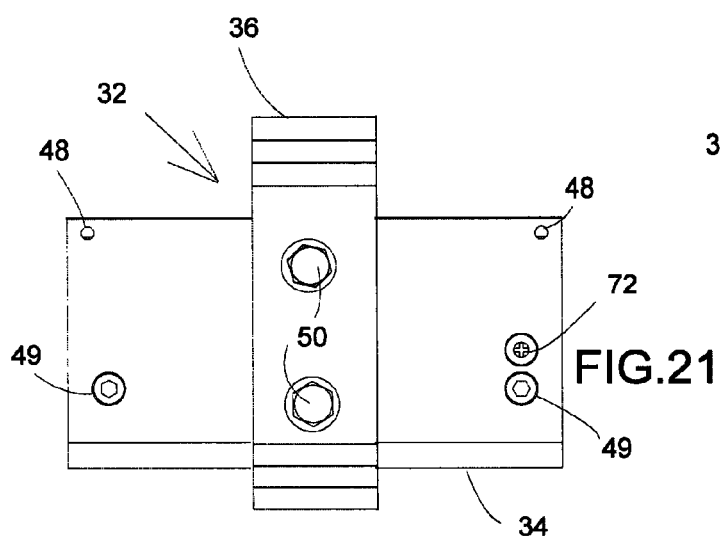
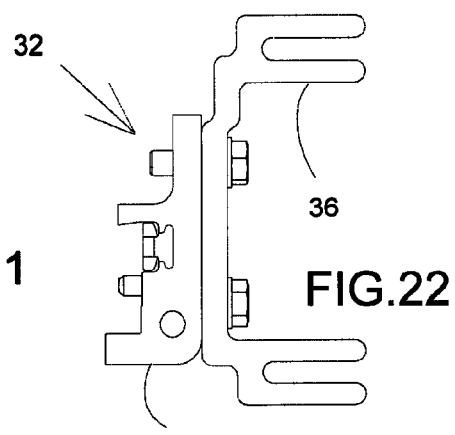
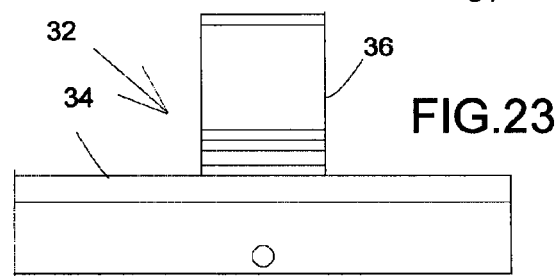

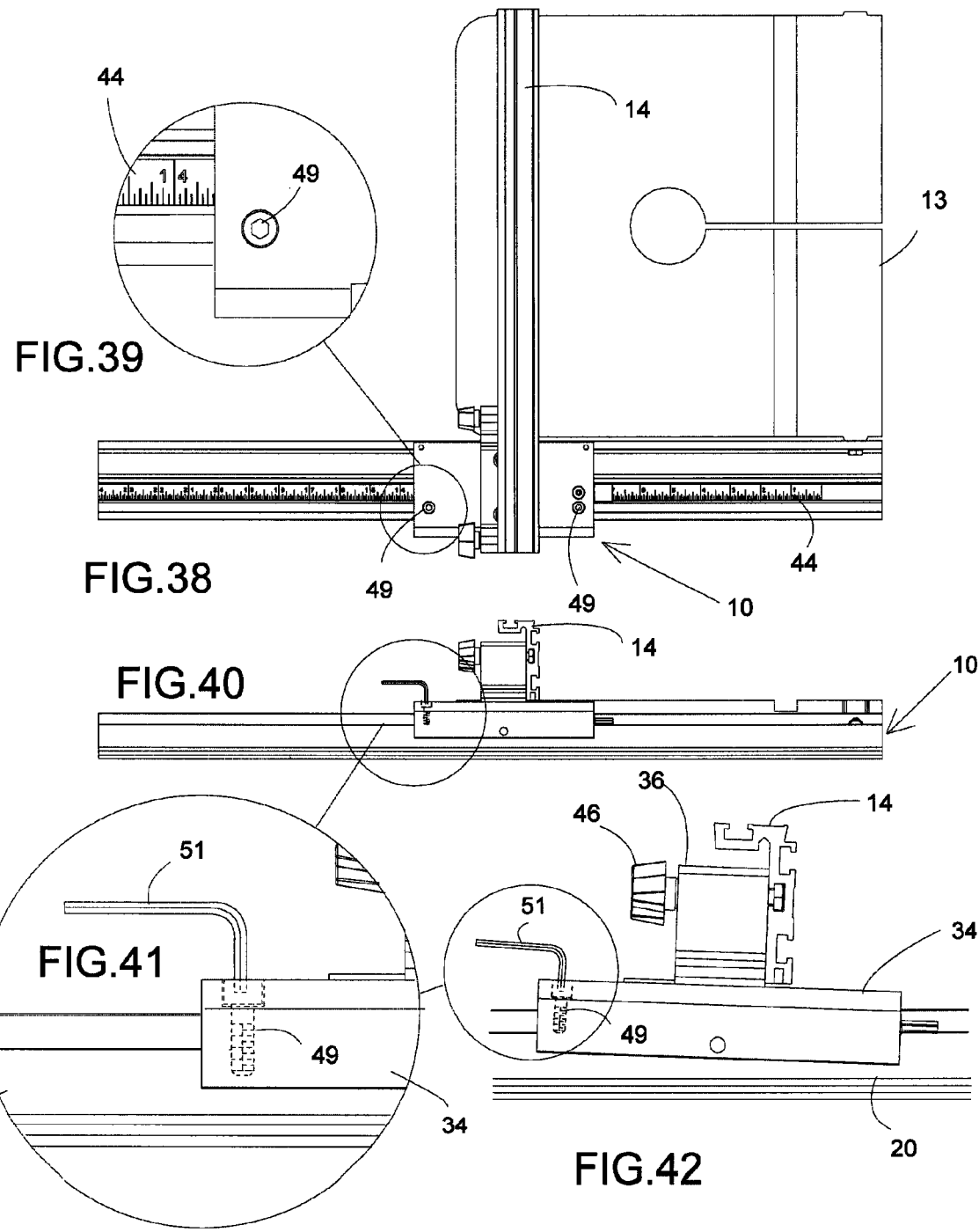

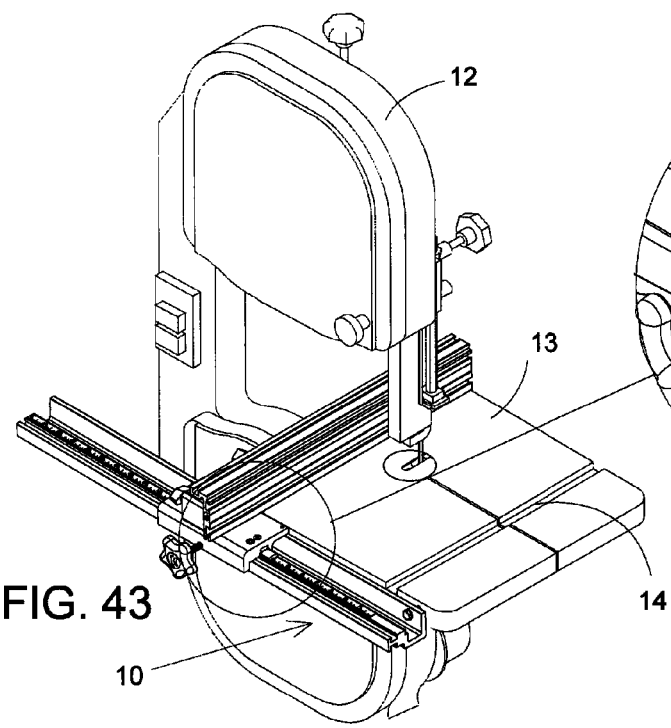
FIG. 43
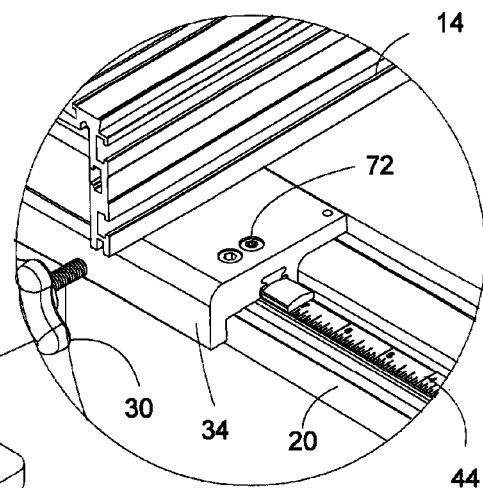
FIG. 44
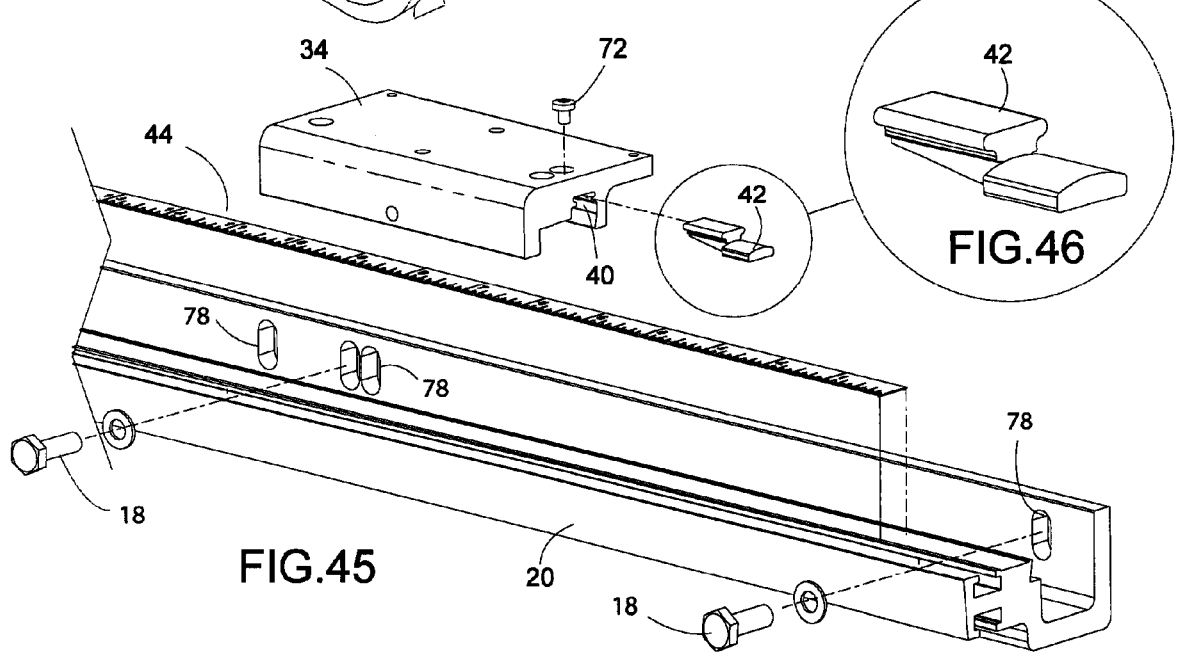
FIG. 45
FIG. 46

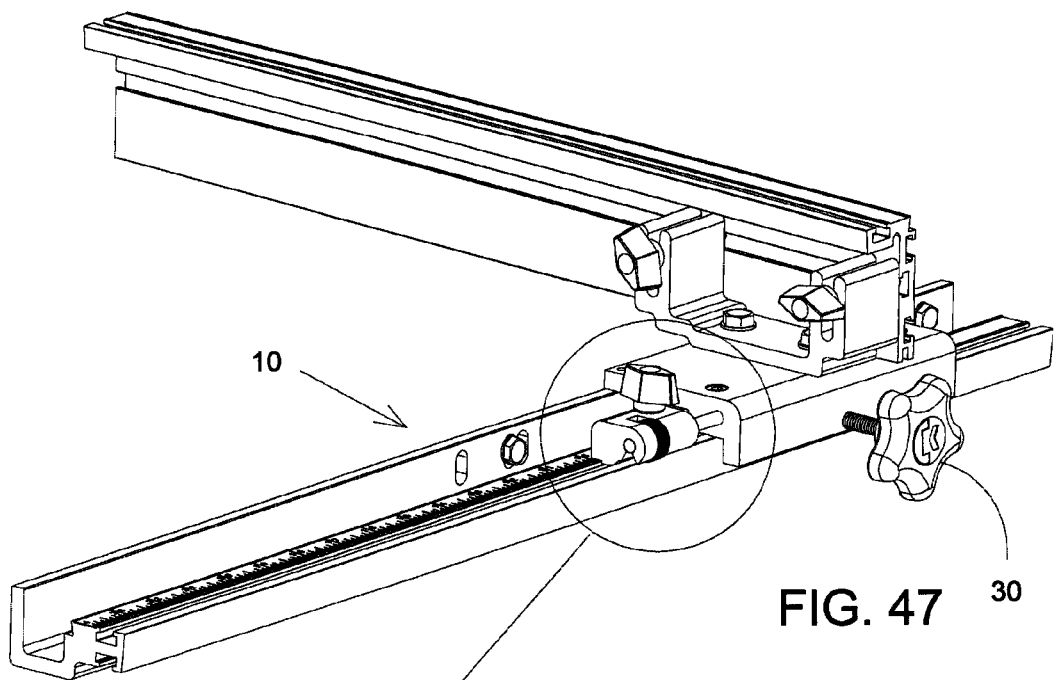
FIG. 47
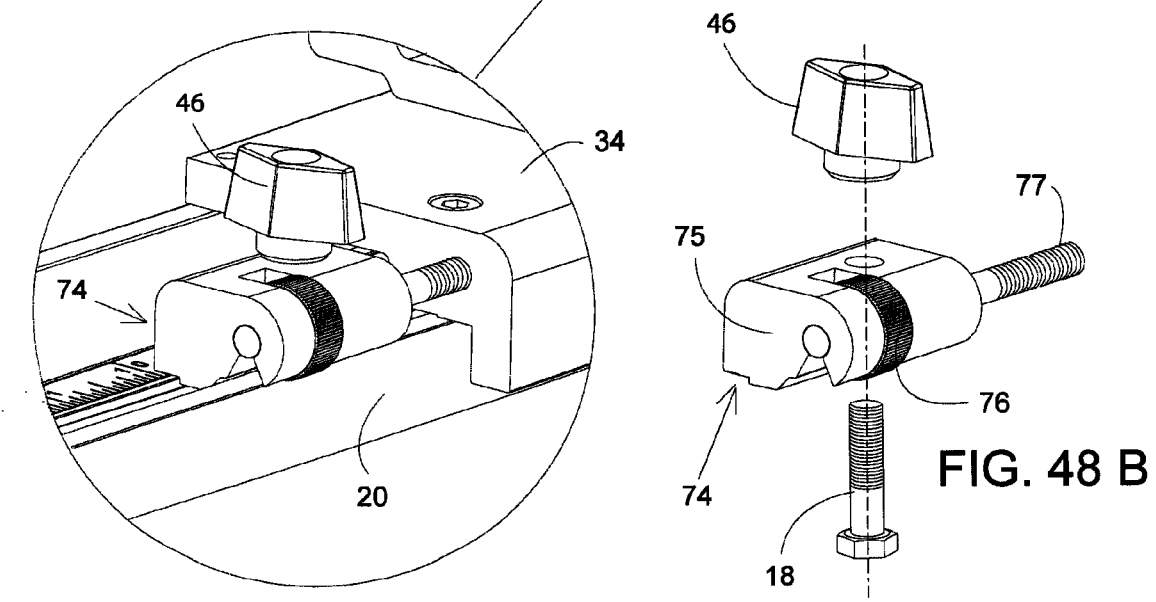
FIG. 48 A
FIG. 48 B

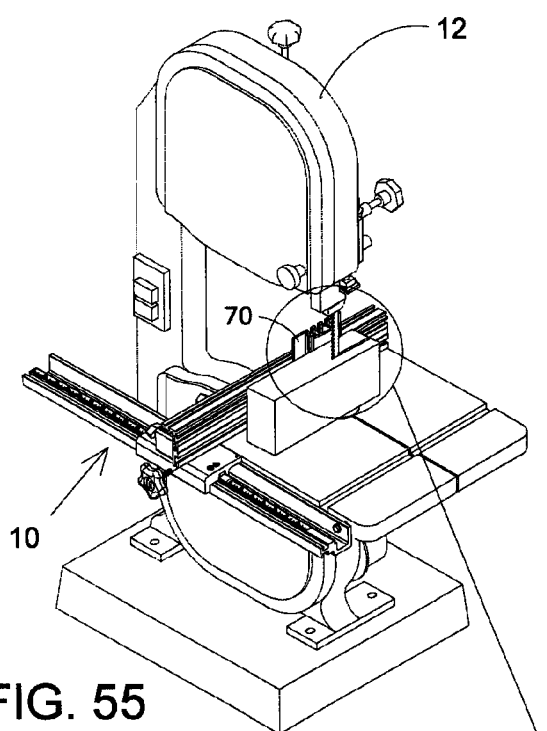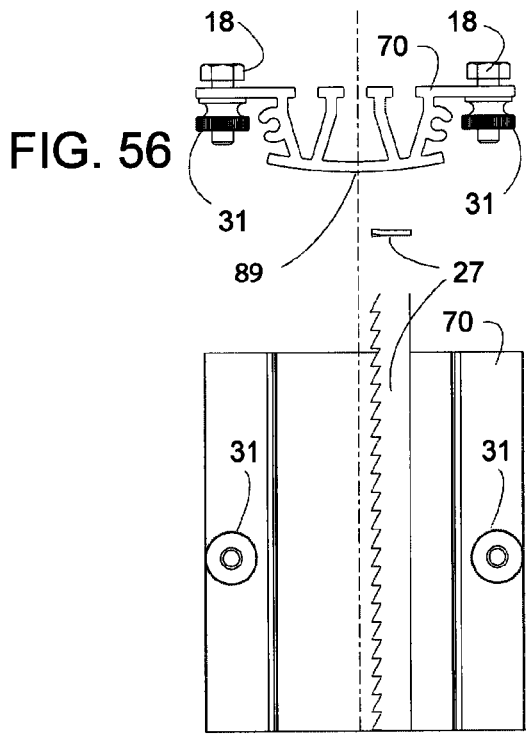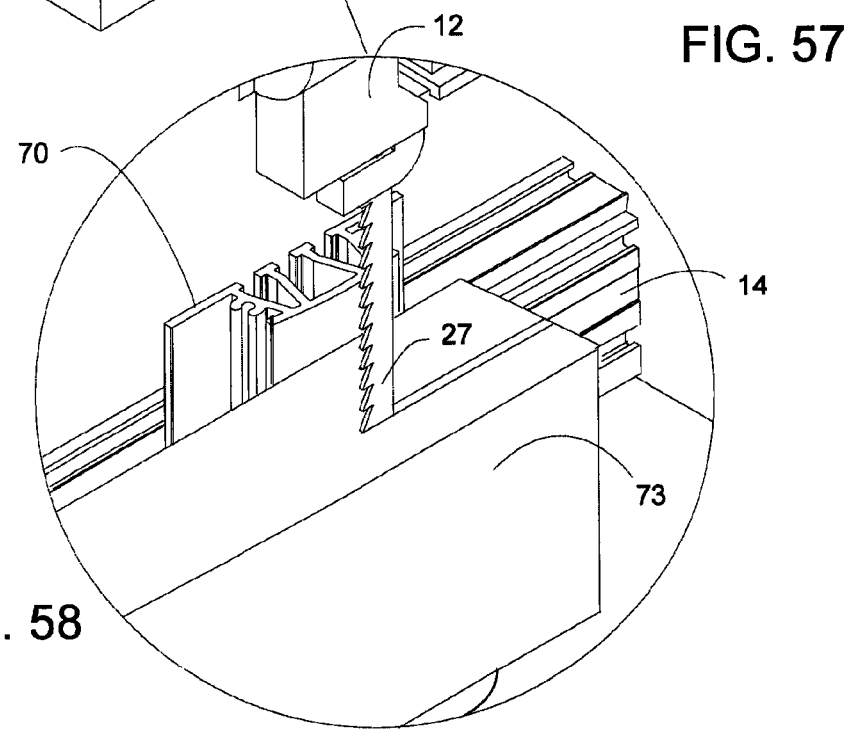
FIG. 55  FIG. 56  FIG. 57  FIG. 58

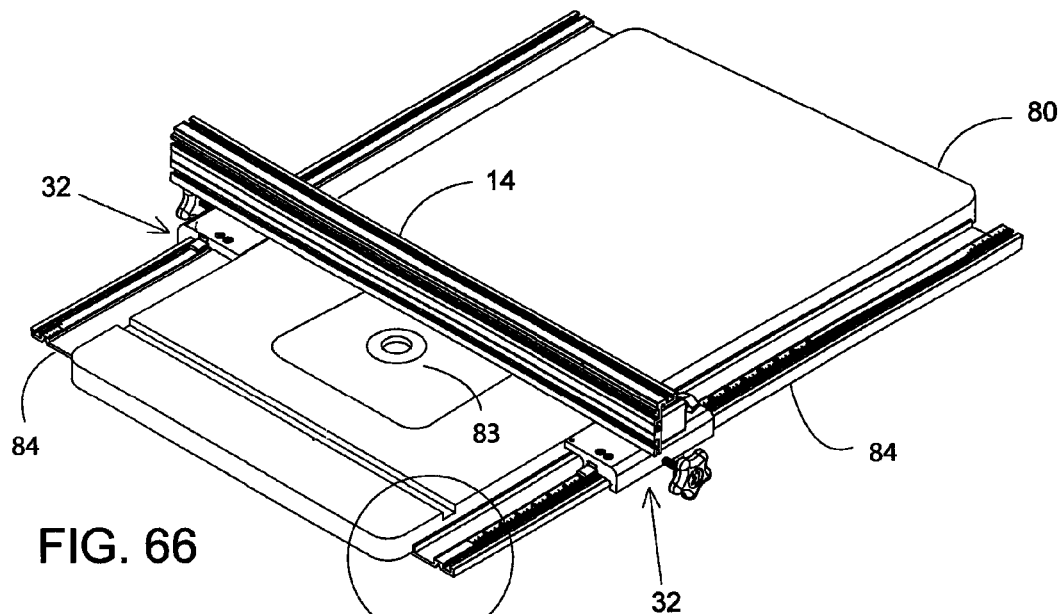
FIG. 66
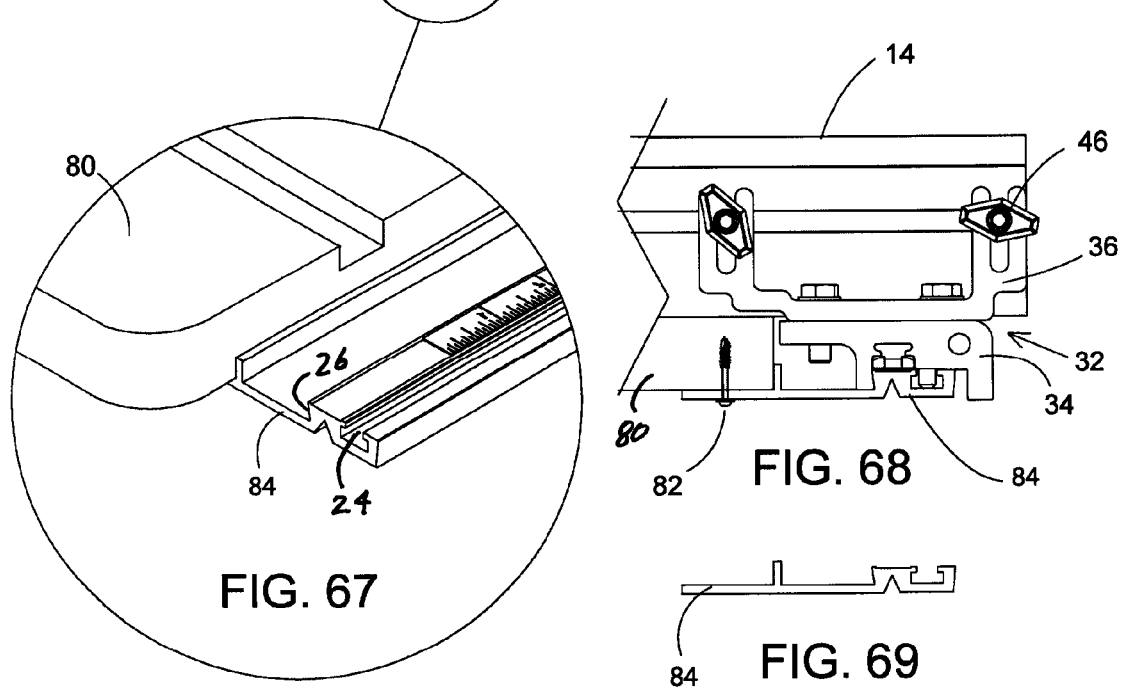
FIG. 67
FIG. 68
FIG. 69

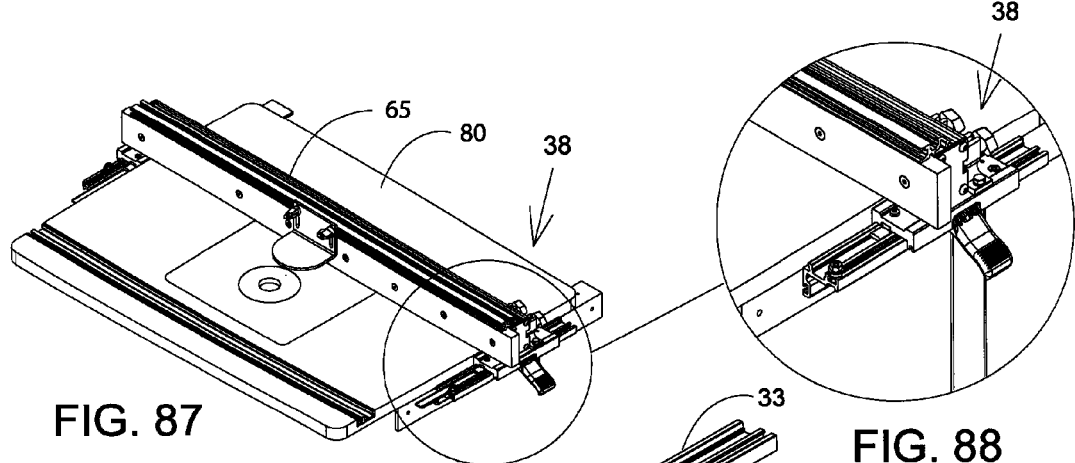
FIG. 87
FIG. 88
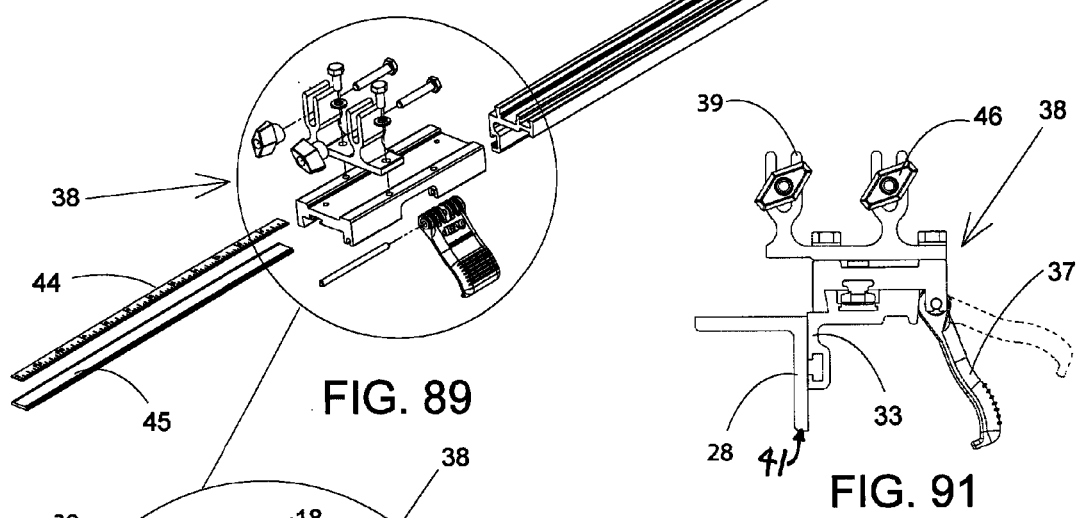
FIG. 89
FIG. 91
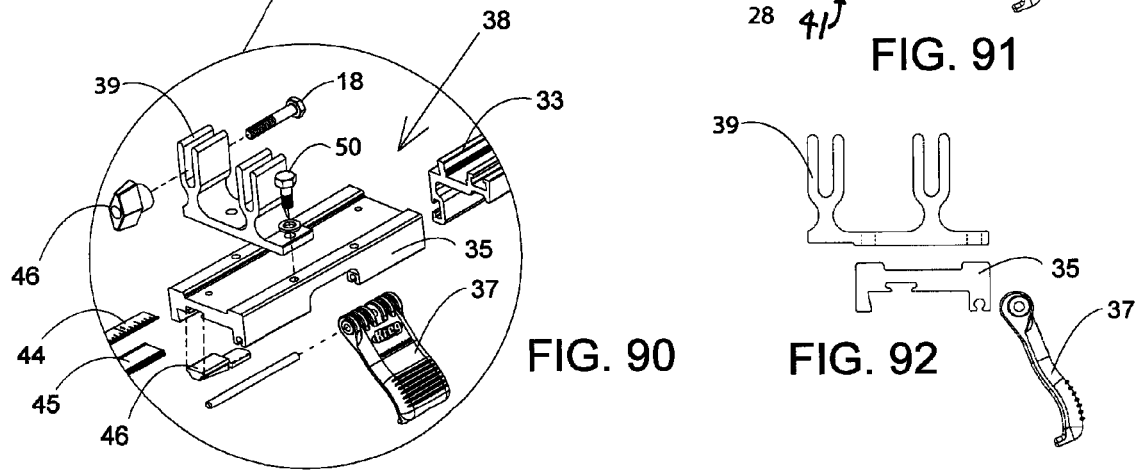
FIG. 90
FIG. 92

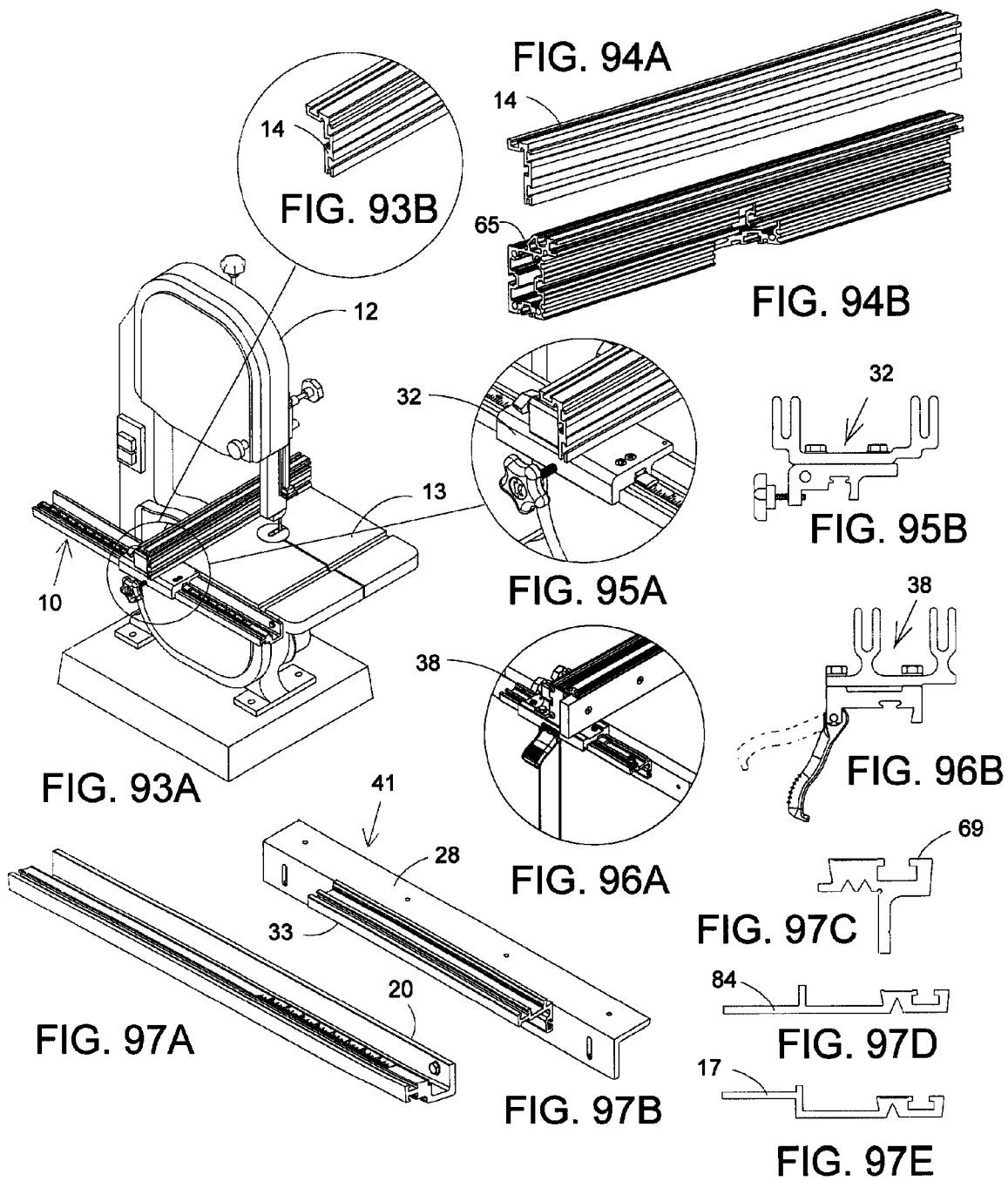

UNIVERSAL MACHINERY FENCE SYSTEM

CROSS-REFERENCE TO RELATED APPLICATION

This claims the benefit of U.S. Provisional Patent Application No. 60/678,502 filed May 6, 2005.

STATEMENT CONCERNING FEDERALLY SPONSORED RESEARCH OR DEVELOPMENT

Not applicable.

FIELD OF THE INVENTION

This invention relates to shop made jigs and fixtures and machine fences for positioning, aligning, guiding, and/or holding a workpiece on metalworking or woodworking machines during a cutting, drilling, shaping, or other workpiece material removal operation.

BACKGROUND OF THE INVENTION

U.S. Pat. Nos. 5,337,641, 5,617,909, 5,768,966, and U.S. Patent Publication No. US2005 0056345 A1, the disclosures of which are hereby incorporated by reference, disclose improved jigs and fixtures for aligning, guiding, and/or holding a workpiece as it is worked, for example as it is cut, drilled, or routed. While the jigs and fixtures disclosed in U.S. Pat. Nos. 5,337,641, 5,617,909, 5,768,966, and U.S. Patent Publication No. US2005 0056345 A1, represent a significant advance in the art, room still exists for improvements, particularly in the following respects:

Extruded aluminum tracks in production are designed to accurately crosscut pieces to length by providing a cross cut fence and stop system for the tablesaw miter gauge, and cross cut fences for the radial arm saw and miter saw. The L-shaped extrusion of the U.S. Pat. No. 5,768,966 and U.S. patent application Ser. No. 10/944,035, has also been used as a router table fence and band saw fence. The mechanism for securing the fence to the machine has been with the use of the extrusion T-slots which are cumbersome and requires sliding the fence mechanism to the end of the track to release the fence from the T-slot. There is always a slight variation in the extrusion which compromises the fit between the T-slot and the mating fence mechanism. When using the T-slot mechanism to mount a rip fence, adjusting the fence extrusion square to the table, which is desirable for the band saw, is problematic. No mechanism allows a fence to easily be moved from one side of a band saw blade to the opposite side of the blade or allows the same fence to be moved quickly from one machine to another such as from the drill press, router table, and shaper.

There is no fence mounting rail system that fits a variety of machine tables such as the cast iron table of the band saw and shaper, the 1⅛" table of the router table, and the ¾" material of a shop made drill press table.

No fence is designed to quickly be squared to the table or adjust quickly to an out-of-square position as required when resawing wide material on a band saw when the top guide post does not raise and lower square to the table, which is often the case. In that instance, it would be easier to adjust the fence parallel to the band saw blade than to have to readjust the band saw guides to make the blade square to the table.

No router table fence is designed to accommodate the use of the router in the in-table position, which is desirable for small workpieces, and then also be used as a guide for the router on top of the workpiece which is desirable when working on large panels when making a rabbet or a dado or when using a fence to accurately position biscuits or pocket holes.

None of the fence systems available are designed to accommodate the removal of the fence extrusion by simply loosening two knobs which allow the fence extrusion to be quickly rotated, reversed, or turned end-for-end. No fence system allows the fence extrusion to quickly be adjusted to rest flat on the machine table or on top of a workpiece. No fence system easily adjust for any discrepancies of different rail heights when moving a fence from one machine to another. No fence system offers a variety of rail mounting systems so that the fence can be used on standard machine cast iron tables or shop made wood tables. There is no universal fence system that quickly adapts to every machine in a metal or woodworking shop.

SUMMARY OF THE INVENTION

The invention provides a universal machinery fence system that has a rail for attachment to a work table of a workpiece material removal machine and the rail defines a track. A clamp block is releasably assembled to the rail with surfaces that mate with the track of the rail to guide the clamp block linearly along the rail. The clamp block includes a fastener for securing the position of the clamp block along the rail. The system includes a fence for guiding a workpiece into the material removal tool, the fence being fixed to the clamp block. The clamp block and fence can be used on any of a band saw, a router, a table saw and a drill press by substituting the rail for a rail of a different cross-sectional shape.

The rail can be in any of a number of configurations attached to different types of workpiece material removal machines. These include a U-shaped rail that has mounting holes in one leg of the U and has the track defined on the other leg of the U. This configuration is for mounting to the side surface of the work table. In other configurations, the rail is T-shaped for mounting to a corner, generally flat for mounting to the bottom of a table, or generally flat with a step up for mounting to the bottom of a thinner table.

In a preferred form, the invention also includes an adapter mount. The adapter mount is fastened to the clamp block and is also fastened to the fence, with the fence running generally perpendicular to the rail.

In any of the rail configurations, it is also useful to include a T-slot which can serve as a guide for a stop to "remember" the position of the clamp block along the rail, or for a microadjuster to make fine adjustments in the linear position of the clamp block along the rail. A T-slot can also be provided in the bottom surface of the rail as may be useful for connecting two of the rails together end-to-end or for other applications.

In another aspect, leveling screws can be provided threaded into the clamp block through the top of the clamp block and down so as to seat with their ends against the rail, preferably in the bottom of a T-slot provided in the top of the rail. The leveling screws can be turned so as to adjust the angle of the clamp block relative to the rail which also has the effect of adjusting the angle of the fence relative to the cutter of the machine. These can be useful to place the working plane of the fence exactly parallel to the cutting plane of the cutter or to place it at a different angle relative to the cutting plane.

In another aspect, the adapter mount is secured to the clamping block with fasteners that are threaded into the clamping block about a vertical axis. The fasteners extend through at least one hole in the adapter mount that is oversized relative to the fastener so that the adapter mount can be either angled to extend perpendicular to the rail or it can be angled slightly to extend at a slight angle to the rail, which also has the effect of angling the fence relative to the rail and relative to the work table and cutter of the machine. This can be useful in setting up the machine and adjusting the fence relative to the cutter.

In an especially preferred form, the adapter mount has a double yoke configuration in which it defines two slots that are spaced apart in their direction parallel to the fence and that run generally perpendicularly to the fence. Bolts for mounting the fence extend through the slots and can be secured with thumb screws on the rear side of the adapter mount. The bolt heads are received in a T-slot in the back of the fence, so that the fence is also adjustable linearly relative to the adapter mount, in a direction that is generally perpendicular to the direction of the rail. Preferably, the fence is L-shaped with T-slots on its top and front faces for the mounting of accessories such as stops, microadjusters, and extension extrusions.

The rail, clamping block, adapter mount, and fence are all preferably made of extruded aluminum, and therefore, have profiles which are capable of being so made.

In an especially preferred form, the track of the rail and the clamp block have mating angled surfaces, preferably of a standard dovetail angle, with the angled surface on the rail being angled so as to face downwardly and the mating surface on the clamp block being angled at a mating angle and so as to face upwardly. A screw knob opposite from the angled face of the clamp block that is screwed into the clamp block bears against the side of the track that is opposite from the angled face of the track so that when the screw knob is tightened, the two angled faces are forced into abutment with one another, which tends to hold the clamp block down against the track. The screw knob can be loosened to slide the clamp block along the track and can be loosened even more until the two mating angled surfaces can clear one another so that the clamp block can be lifted off of the track, without having to run the clamp block to one end or the other of the track.

In another preferred aspect, the track is provided with a ruler on its top surface and the clamp block mounts a magnifier through which the demarcations on the ruler can be viewed to make them more visible. The magnifier can be molded of transparent plastic and be configured so as to fit in a slot in the end of the clamp block and be secured therein by a fastener, so that the fastener can be loosened and the magnifier can be adjusted linearly so as to make fine adjustments in the measurements indicated by the magnifier.

In another aspect, the invention provides a curved saw guide. The saw guide can be mounted to the working face of the fence, for example, in the T-slots in the working face of the fence with bolts that have heads captured in the T-slots. In the vertical direction, the curved face extends generally parallel to the cutter, for example a band saw blade, and in the direction of feed, the saw guide has a curved face that permits repositioning of the work in the feed direction by angling it against the convex curved face of the guide.

In another aspect of the invention, rails can be provided on both sides of the work table that are parallel and spaced apart from one another. Similarly, a clamping block can be assembled to each rail and an adapter mount to each clamping block with a fence spanning both adapter mounts. This provides a fence that is rigidly fixed at both sides of the work table to provide a very rigid work face of the fence for guiding workpieces into the cutter. Rulers can be provided on one or both rails for making accurate measurements, and the connection of the adapter mounts to the clamp block also permits some angling of the fence relative to the cutter and relative to the table.

In another form, the fence, being L-shaped, can be assembled to the adapter mount in any of a number of orientations, including one in which the long leg of the L is vertical and another in which the short leg of the L is vertical. Preferably, in at least one of these positions, there is a space created between the fence and the top surface of the table such that a workpiece can be slid into the space and an edge of the fence can be used to guide a tool such as a router to make a cut in the piece that is slid between the fence and the work table. For example, the space between the fence and the work table may be advantageously chosen to be ¾", which is a common workpiece thickness. The T-slots on the fence would therefore be positioned so as to produce the desired spacing.

Other features and advantages of the invention will be apparent from the detailed description and drawings.

BRIEF DESCRIPTION OF THE DRAWINGS

FIG. 9 is an end elevation view of the fence bracket assembly of the rip fence located on the U-shaped fence rail;

FIG. 10 is an end elevation view of the L-shaped fence;

FIG. 11 Is an end elevation view of the adapter mount extrusion of the fence bracket assembly;

FIG. 12 is an end elevation view of the clamp block extrusion of the fence bracket assembly;

FIG. 13 is an end elevation view of the fence rail extrusion of the rip fence;

FIG. 20 is an exploded perspective view of the rip fence assembly showing the adapter mount extrusion bolted to the clamp block extrusion;

FIG. 21 is a top view of the rip fence assembly showing the adapter mount extrusion bolted to the clamp block extrusion;

FIG. 22 is a side view of the rip fence assembly showing the adapter mount extrusion bolted to the clamp block extrusion;

FIG. 23 is an end view of the rip fence assembly showing the adapter mount extrusion bolted to the clamp block extrusion;

FIG. 38 is a top view of the rip fence of the invention positioned on the U-shaped dovetail track as it is used on a cast iron band saw table;

FIG. 39 is a detail view of FIG. 38 showing the leveling screw on the side of the clamp bracket;

FIG. 40 is a front view of the rip fence of the invention positioned on the U-shaped dovetail track as it is used on a cast iron machine table as shown in FIG. 39;

FIG. 41 is a detail view of FIG. 40 showing the allen wrench for adjusting the fence angle;

FIG. 42 is an elevation end view of the rip fence assembly showing the double yoke adapter mount extrusion and the clamp block extrusion angled in relationship to the front rail;

FIG. 43 is a perspective view of the rip fence of the invention positioned on the U-shaped dovetail track with the stick-on tape located under the magnification lens;

FIG. 44 is a detail view of FIG. 43;

FIG. 45 is an exploded perspective view of the clamp block extrusion, the stick-on tape, the magnification lens, and the U-shaped dovetail track;

FIG. 46 is a detail view of the magnification lens shown in FIG. 45;

FIG. 47 is a perspective view of the rip fence of the invention positioned on the U-shaped dovetail track with the fence microadjuster screwed into the side of the clamp block extrusion;

FIG. 48A is a detail view of FIG. 47;

FIG. 48B is an exploded perspective view of the microadjuster;

FIG. 55 is a perspective view of the rip fence as it is used on a band saw with the resaw guide extrusion attached shown cutting a thick piece of wood;

FIG. 56 is an end elevation view of the resaw guide with the blade located slightly in front of the midpoint of the apex of the curve;

FIG. 57 is a side elevation view of FIG. 56;

FIG. 58 is a detail view of FIG. 55;

FIG. 66 is a perspective view of the rip fence of the invention as it is used on a standard 1⅛" router table with the rip fence assembly located on the custom fence extrusion on the front and back of the router table;

FIG. 67 is a detail view of the custom fence rail track extrusion designed for a standard 1⅛" router table;

FIG. 68 is an end view of FIGS. 66 and 67 with the rip fence bracket assembly located on the custom fence extrusion on the front of the router table;

FIG. 69 is an end view of the custom fence extrusion for the front and back fence rail of the standard 1⅛" router table;

FIG. 87 is a perspective view of a router table with a 1⅛" shop made table top with a cam fence bracket assembly secured to the adjustable height fence rail and a fence secured to the cam fence bracket assembly;

FIG. 88 is an enlarged view of the cam fence bracket assembly;

FIG. 89 is an exploded view of the cam fence bracket assembly and the L-shaped fence adjustable height fence rail;

FIG. 90 is an enlarged exploded view of the cam fence bracket assembly;

FIG. 91 is a end view of the cam fence bracket assembly secured to the adjustable height fence rail;

FIG. 92 is an exploded view of the cam fence bracket assembly;

FIG. 93A is a perspective view of the rip fence of the invention positioned on the U-shaped dovetail track as it is used on a band saw with the L-shaped fence secured to the fence bracket assembly;

FIG. 93B is an enlarged view of the L-shaped fence;

FIG. 94A is a perspective view of the L-shaped fence option available with this system;

FIG. 94B is a perspective view of a box shaped fence option available with this system;

FIG. 95A is an enlarged view of the fence bracket assembly and the L-shaped fence;

FIG. 95B is an end view of the fence bracket assembly;

FIG. 96A is a perspective view of the cam fence bracket assembly secured to the adjustable height fence rail and a box shaped fence secured to the cam fence bracket assembly;

FIG. 96B is an end view of the cam fence bracket assembly;

FIG. 97A is a perspective view of the U-shaped rail;

FIG. 97B is a perspective view of the of the adjustable height rail extrusions;

FIG. 97C is an end view of the T-shaped rail;

FIG. 97D is an end view of the generally flat rail to attach to a 1⅛" table; and FIG. 97E is an end view of the generally flat rail to attach to a ¾" table.

DETAILED DESCRIPTION OF THE PREFERRED EMBODIMENTS

Figure 1:
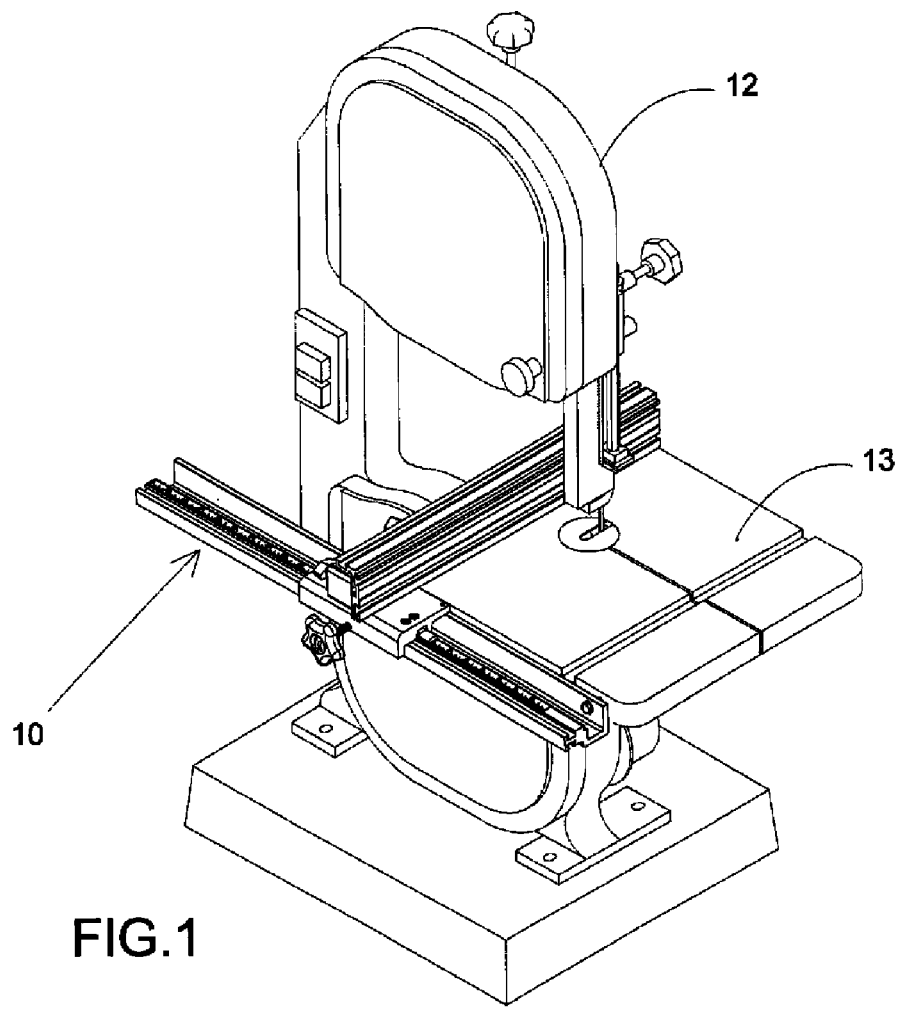
FIG. 1 is a perspective view of the rip fence of the invention positioned on the U-shaped dovetail track as it is used on a band saw.

FIG. 1 illustrates a rip fence system 10 of the invention positioned on the U-shaped dovetail track rail 20 as it is used on a band saw 12. The L-shaped extrusion of U.S. patent application Ser. No. 10/944,035, is used as a band saw fence rather than a crosscut fence. The rip fence system 10 of the invention is secured to the front of the band saw table 13.

Figure 2:
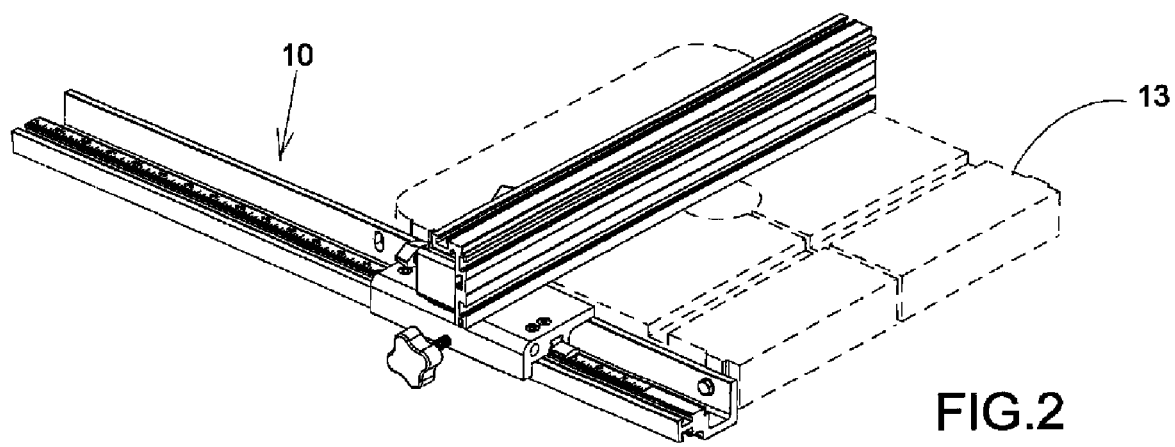
FIG. 2 is a perspective view of the rip fence of the invention positioned on the U-shaped dovetail track as it is used on a cast iron machine table.

FIG. 2 is an enlarged perspective view of the rip fence system 10 of the invention positioned on the U-shaped dovetail track rail 20 as it is used on a cast iron machine table 13.

Figure 3:
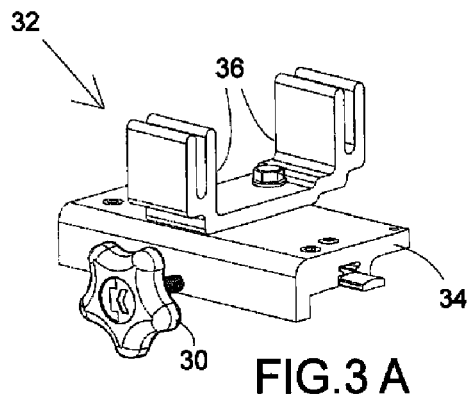
FIG. 3A is an perspective view of the fence bracket assembly of the rip fence.
FIG. 3B is an perspective view of the fence bracket assembly of the rip fence, including the clamp block and the adapter mount.
Figure 3:
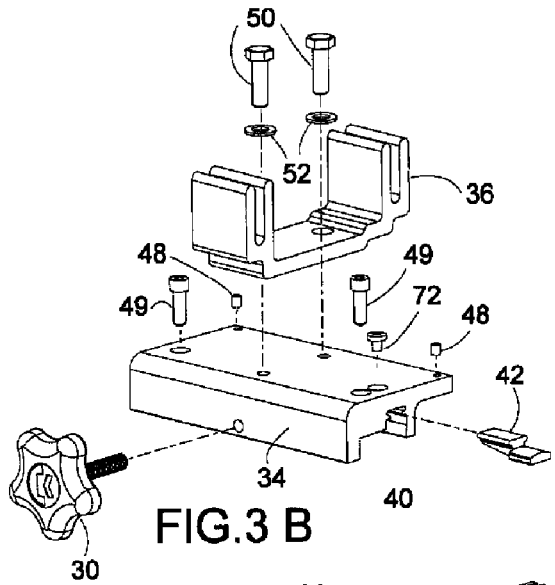

FIG. 3A is a perspective view of the fence bracket assembly 32 of the rip fence with the adapter mount 36 bolted to the top of the clamp block 34. The fence bracket assembly 32 is secured to the various rail designs of the system by tightening the knob 30, or by using a different fastener such as a cam lever.

FIG. 3B is an exploded perspective view of the rip fence showing that the adapter mount 36 is bolted to the clamp block 34 with two 5/16" bolts 50. The magnifier 42 can be molded of transparent plastic and be configured so as to fit in a slot 40 in the end of the clamp block 34.

Figure 4:
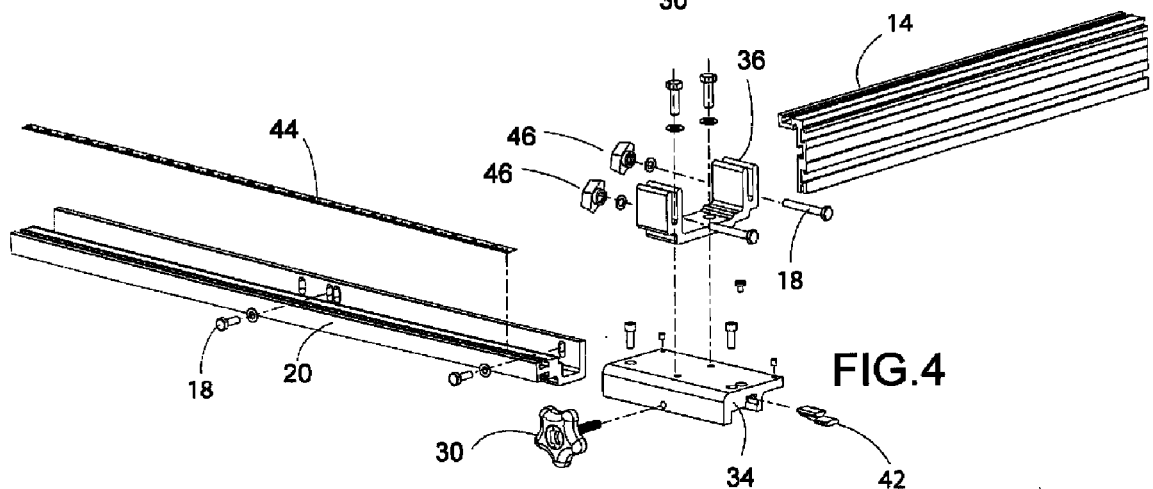
FIG. 4 is an exploded perspective view of the rip fence.

FIG. 4 is an exploded perspective view of the rip fence system 10 as it shown in FIG. 1 showing that the adapter mount 36 is bolted to the clamp block 34 with two 5/16" bolts 50. The clamp block 34 of the rip fence is positioned on the U-shaped dovetail track rail 20 which functions as the front fence rail. The rail 20 may be provided with a ruler 44 on its top surface and the clamp block 34 can mount a magnifier 42 through which the demarcations on the ruler 44 can be viewed to make them more visible.

The fence extrusion 14 in FIG. 4 is an L-shaped track with four T-slots designed with the half dovetail 60 (FIG. 10) on the front (facing forward and downward) and a T-slot 62 on the back (opening backward) and/or a T-slot 64 on top opening upward, and two T-slots 66 and 68 opening toward the front. This extrusion design is disclosed in U.S. Patent Publication No. US20050056345 A1 which is hereby incorporated by reference as if fully disclosed herein and is now used as a rip fence extrusion rather than a cross cut fence. This L-shaped fence design is especially useful for the band saw rip fence because attachments such as a circle jig, a resaw guide or a stop can easily be attached.

Figure 5:
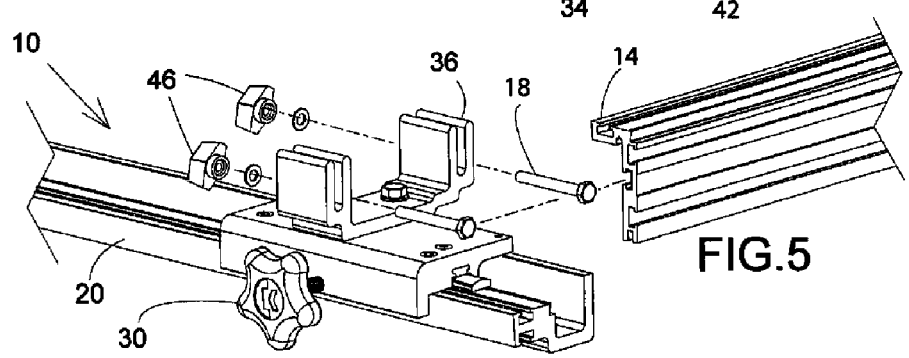
FIG. 5 is a perspective view of the fence bracket assembly of the rip fence positioned on the U-shaped dovetail track with the fence extrusion exploded away.

FIG. 5 is a perspective view of the rip fence system 10 showing that the adapter mount 36 is bolted to the clamp block 34 with two 5/16" bolts 50 (FIG. 3B). The fence extrusion is an L-shaped track 14 with four T-slots. The L-shaped track 14 is secured to the adapter mount 36 with bolts 18 located in the back T-slot. The fence is tightened in place with two plastic 1/4-20 knobs 46.

Figure 6:
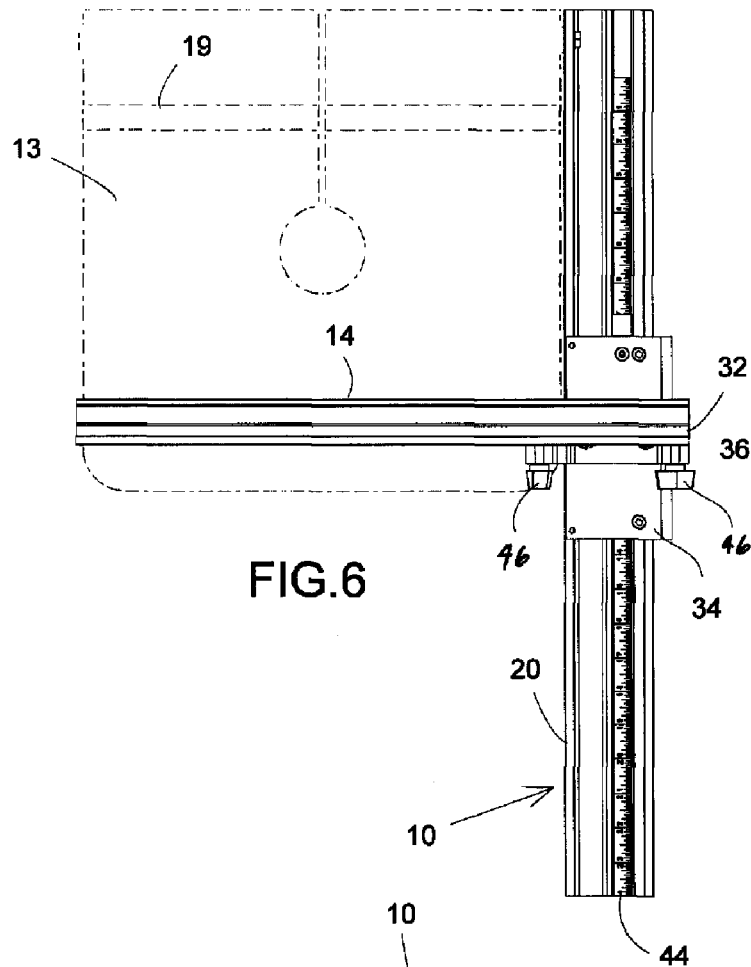
FIG. 6 is a top view of the rip fence of the invention positioned on the U-shaped dovetail track as it is used on a cast iron machine table.

FIG. 6 is a top view of the rip fence of the invention 10 positioned on the U-shaped fence rail track 20 as it is used on a cast iron machine table 13. The ruler 44 can be viewed easily on the top of the U-shaped rail 20.

Figure 7:
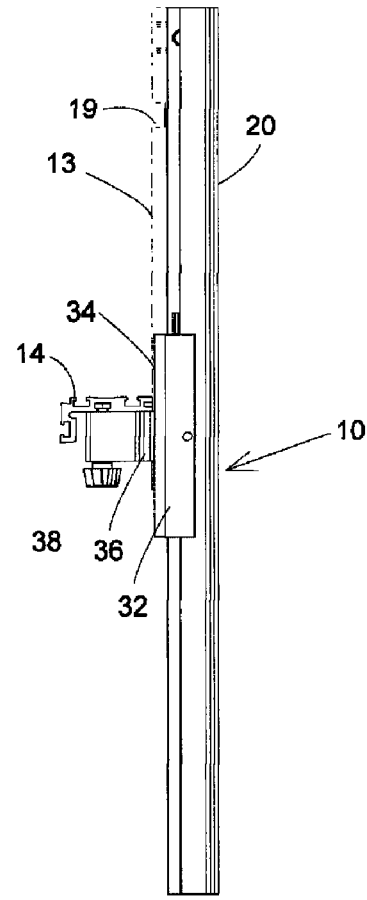
FIG. 7 is an end view of the rip fence of the invention positioned on the U-shaped dovetail track as it is used on a cast iron machine table.

FIG. 7 is an end view of the rip fence 14 of the invention positioned on the U-shaped dovetail track 20 as it is used on a cast iron machine table 13.

Figure 8:
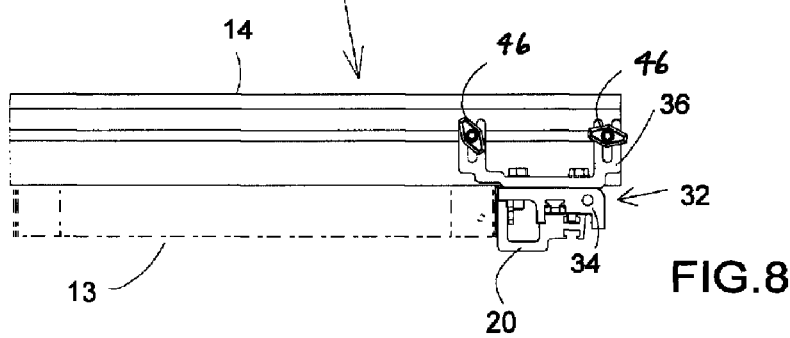
FIG. 8 is a side view of the rip fence of the invention positioned on the U-shaped dovetail track as it is used on a cast iron machine table.

FIG. 8 is a side view of the rip fence of the invention positioned on the U-shaped dovetail track as it is used on a cast iron machine table.

FIG. 9 is an enlarged end elevation view of the fence bracket assembly 32 of the rip fence located on the U-shaped fence rail 20. The adapter mount 36 is bolted to the clamp block 34 with two 5/16" bolts 50.

FIG. 10 is an end elevation view of the L-shaped fence 14 with four T-slots designed with the half dovetail 60 on the front (facing forward and downward) and a T-slot 62 on the back (opening backward) and/or a T-slot 64 on top opening upward, and two T-slots 66 and 68 opening toward the front. This extrusion design is disclosed in U.S. Patent Publication No. US20050056345 A1 which is hereby incorporated by reference and is now used as a rip fence extrusion rather than a cross cut fence. This L-shaped fence design is especially useful for the band saw rip fence because attachments such as a circle jig, a resaw guide or a stop can easily be attached. Preferably, the fence is L-shaped with T-slots on its top and front faces 14 for the mounting of accessories such as stops, microadjusters, and extension extrusions. The bolt heads are received in a T-slot in the back of the fence 62 (FIG. 10), so that the fence is also adjustable linearly relative to the adapter mount, in a direction that is generally perpendicular to the direction of the rail.

FIG. 11 is an end elevation view of the adapter mount 36 extrusion of the fence bracket assembly 32. The adapter mount 36 has a double yoke configuration in which it defines two slots that are spaced apart in their direction parallel to the fence and that run generally perpendicularly to the fence. Two finger like projections 56 run parallel to each other creating the slot for a bolt 18. The bolts 18 for mounting the fence 14 extend through the slots and can be secured with thumb screws 46 on the rear side of the adapter mount. The bolt heads are received in a T-slot in the back of the fence 62 (FIG. 10), so that the fence is also adjustable linearly relative to the adapter mount, in a direction that is generally perpendicular to the direction of the rail. Preferably, the fence is L-shaped with T-slots on its top and front faces 14 for the mounting of accessories such as stops, microadjusters, and extension extrusions.

FIG. 12 is an end elevation view of the clamp block 34 extrusion of the fence bracket assembly 32 showing the clamp block 34 has angled surface 29 that mates with the angled surface on the rail 26. A screw knob 30 opposite from the angled face of the clamp block 34 that is screwed into the clamp block 34 bears against the side of the track that is opposite from the angled face of the track so that when the screw knob is tightened, the two angled faces 26 and 29 are forced into abutment with one another, which tends to hold the clamp block 34 down against the track. The screw knob 30 can be loosened to slide the clamp block 34 along the track and can be loosened even more until the two mating angled surfaces can clear one another so that the clamp block 34 can be lifted off of the track, without having to run the clamp block 34 to one end or the other of the rail track 20.

FIG. 13 is an end elevation view of the fence rail 20 extrusion of the rip fence showing the angled surface 26 that mates with the angled surface 29 on the clamp block 34. A T-slot 24 which is a longitudinal guide for releasably mounting accessories to the track such as the microadjuster 74. It may also have a T-slot 25 on the bottom, opposite T-slot 24, that may be used for mounting accessories or extending the rail 20 with another rail 20 by placing a mating piece in the T-slot 25 that connects the two rails 20.

Figure 14:
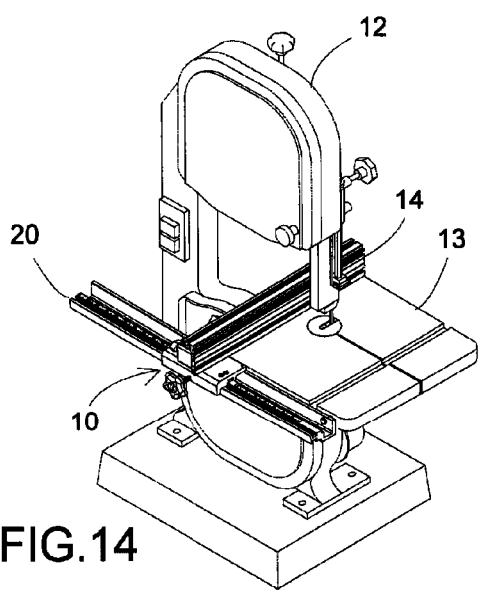
FIG. 14 is a perspective view of the rip fence of the invention positioned on the U-shaped dovetail track as it is used on a left hand design band saw.

FIG. 14 is a perspective view of the rip fence 10 of the invention positioned on the U-shaped dovetail track 20 as it is used on a left hand design band saw 12.

Figure 15:
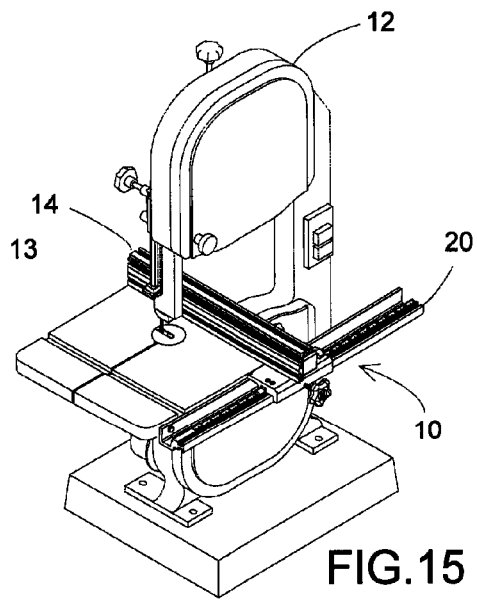
FIG. 15 is a perspective view of the rip fence of the invention positioned on the U-shaped dovetail track as it is used on a right hand design band saw.

FIG. 15 is a perspective view of the rip fence 10 of the invention positioned on the U-shaped dovetail track 20 as it is used on a right hand design band saw 12.

Figure 16:
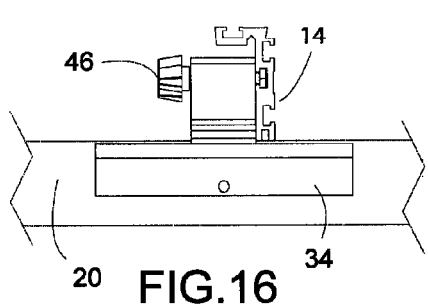
FIG. 16 is a end view of the rip fence extrusion of the invention positioned on the U-shaped dovetail track as it is used on a left hand design band saw.

FIG. 16 is a end view of the rip fence extrusion 14 of the invention positioned on the U-shaped dovetail track 20 as it is used on a left hand design band saw 12. The fence extrusion 14 can be rotated and positioned on either side of the adapter mount 36.

Figure 17:
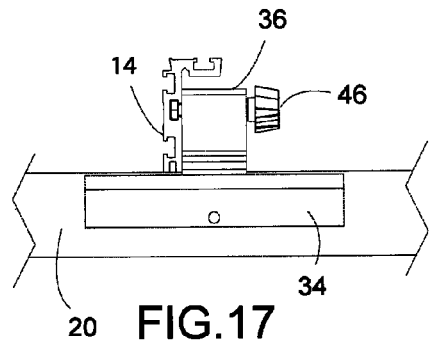
FIG. 17 is a end view of the rip fence extrusion of the invention positioned on the U-shaped dovetail track as it is used on a right hand design band saw.

FIG. 17 is an end view of the rip fence extrusion 14 of the invention positioned on the U-shaped dovetail track 20 as it is used on a right hand design band saw and tightened in place with the plastic 1/4-20 knob 46.

Figure 18:
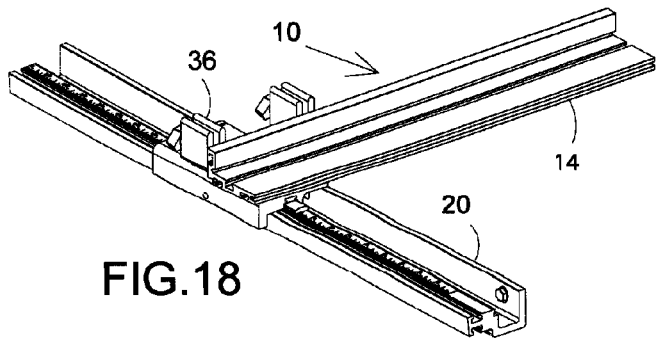
FIG. 18 is a perspective view of the rip fence of the invention positioned on the U-shaped dovetail track with the fence attached to the adapter mount in the low position with the wide leg of the L-shaped T-track resting on the table.

FIG. 18 is a perspective view of the rip fence 10 of the invention positioned on the U-shaped dovetail track 20 with the fence 14 attached to the adapter mount 36 in the low position with the wide leg of the L-shaped T-track 59 resting on the band saw table 13.

Figure 19:
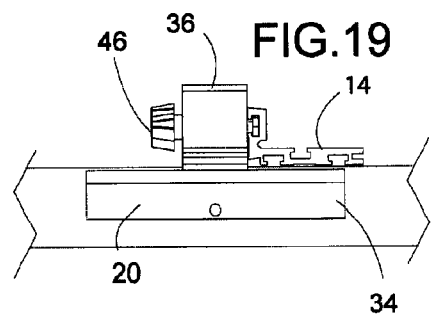
FIG. 19 is an end elevation view of the fence rail extrusion as shown in FIG. 18.

FIG. 19 is an end elevation view of the fence rail extrusion 14 as shown in FIG. 18. When used in this position, with the long leg of the fence 14 resting on the band saw table 13, the top guide of the band saw blade can be lowered to be just above the workpiece 73 so narrow pieces can be ripped safely.

FIG. 20 is an exploded perspective view of the rip fence bracket assembly 32 showing the bolting of the adapter mount 36 to the clamp block 34 with two 5/16" bolts 50.

FIG. 21 is a top view of the rip fence bracket assembly 32 showing the adapter mount 36 extrusion bolted to the clamp block extrusion 34 with two 5/16" bolts 50.

FIG. 22 is a side view of the rip fence bracket assembly 32 showing the adapter mount 36 extrusion bolted to the clamp block 34 extrusion.

FIG. 23 is an end view of the rip fence bracket assembly 32 showing the adapter mount 36 extrusion bolted to the clamp block extrusion 34.

Figure 24:
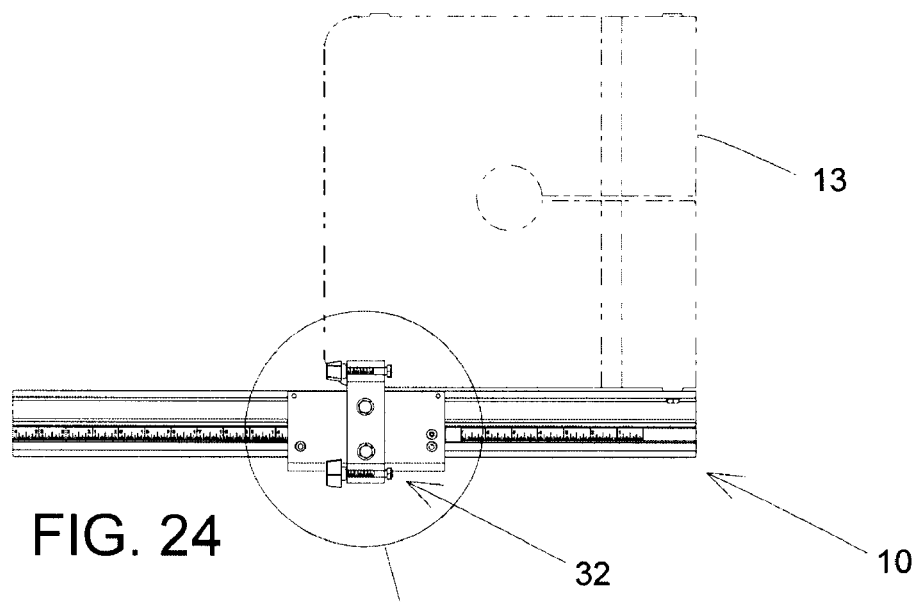
FIG. 24 is a top view of the rip fence assembly showing the adapter mount extrusion bolted to the clamp block extrusion clamped to the front fence rail which is bolted to a cast iron table shown in phantom.

FIG. 24 is a top view of the rip fence bracket assembly 32 showing the adapter mount 36 extrusion bolted to the clamp block 34 extrusion clamped to the front fence rail 20 which is bolted to a cast iron table 13.

Figure 25:
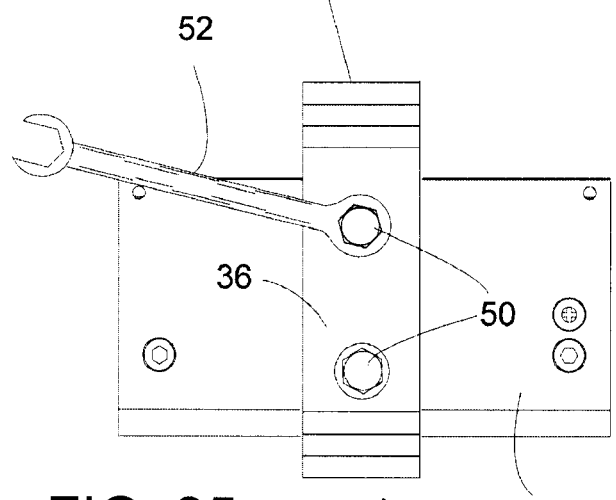
FIG. 25 is an enlarged view of the rip fence assembly shown FIG. 24 with the angle adjustment wrench engaged with the front bolt which secures the adapter mount extrusion to the clamp block extrusion.

FIG. 25 is an enlarged top view of the rip fence bracket assembly 32 shown in FIG. 24 with the angle adjustment wrench 52 engaged with the front bolt 50 which secures the adapter mount 36 extrusion to the clamp block extrusion 34. Band saws usually do not cut straight which is called blade lead. It is standard practice to adjust the angle of the fence to correspond to the angle at which the saw cuts best. It is best to adjust the fence by first making a test cut with a piece of scrap to determine at what angle the board should be fed into the blade 27. After the best angle is determined the adapter mount 36 should be loosened and then adjusted for the desired angle.

Figures 26, 27, 28:
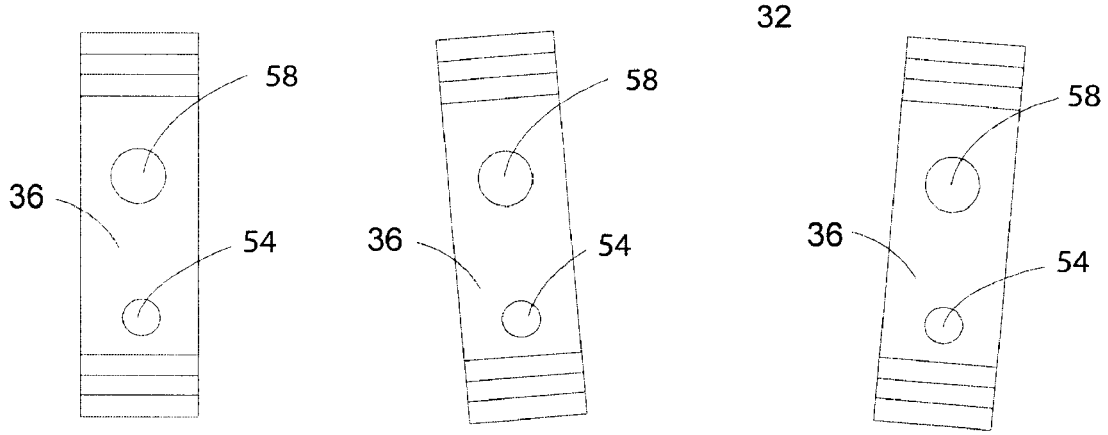
FIG. 26 is a top view of the adapter mount extrusion showing the two holes through which it is mounted to the clamp block extrusion and showing that the front hole is larger than the back hole.
FIG. 27 is a top view of the adapter mount extrusion angled to the left showing that the large front hole allows it to be secured to the clamp block extrusion at an angle.
FIG. 28 is a top view of the adapter mount extrusion angled to the right showing that the large front hole allows it to be secured to the clamp block extrusion at an angle.

FIG. 26 is a top view of the adapter mount 36 extrusion showing the two holes through which it is mounted to the clamp block 34 extrusion and showing that the front hole 58 is larger than the back hole 54;

FIG. 27 is a top view of the adapter mount 36 extrusion angled to the left showing that the large front hole 58 allows it to be secured to the clamp block 34 extrusion at an angle to compensate for blade lead. The smaller hole 54 is only slightly bigger than the bolt 55 so the front bolt functions as a rotation point. With this amount of angle and the amount illustrated in FIG. 28, it is considered that the adaptor mount 36 is still generally perpendicular to the clamp block 34.

FIG. 28 is a top view of the adapter mount 36 extrusion angled to the right. As band saw blades dull, the tendency for blade lead increases so the fence may require frequent adjustments.

Figure 29:
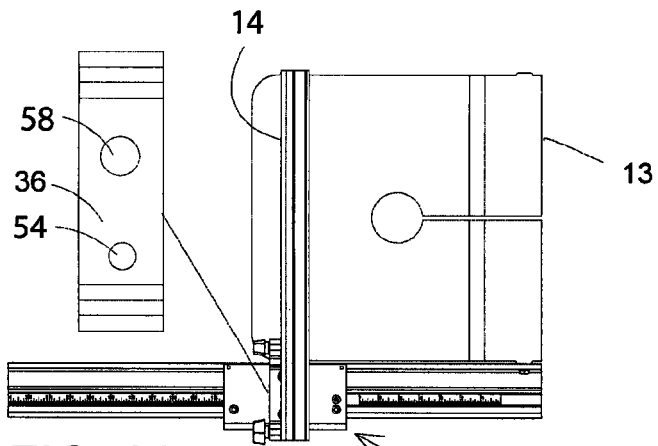
FIG. 29 is a top view of the rip fence assembly showing the adapter mount extrusion bolted to the clamp block extrusion which is clamped to the front fence rail which is bolted to a cast iron table. This drawing shows the adapter mount extrusion bolted square to the edge of the clamp block extrusion.

FIG. 29 is a top view of the rip fence 10 showing the adapter mount 36 extrusion bolted to the clamp block 34 extrusion which is clamped to the front fence rail 20 which is bolted to a cast iron table 13. This drawing shows the adapter mount 36 extrusion bolted square to the front edge of the clamp block extrusion.

Figure 30:
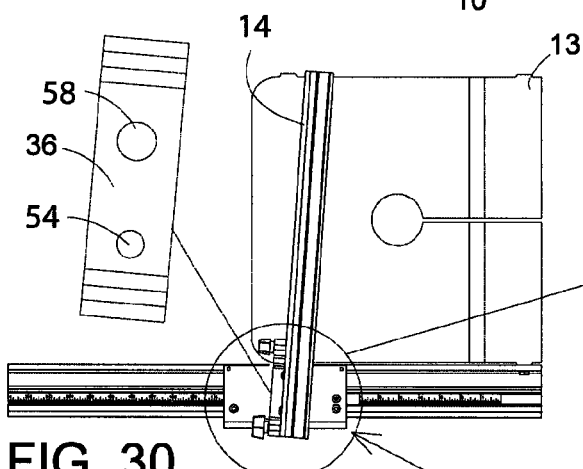
FIG. 30 is a top view of the rip fence assembly showing the adapter mount extrusion bolted to the clamp block extrusion clamped to the front fence rail which is bolted to a cast iron table. The rip fence extrusion is secured to the adapter mount extrusion. This drawing shows the adapter mount extrusion bolted at an angle to the edge of the clamp block extrusion. The rip fence extrusion angles to the right.

FIG. 30 is a top view of the rip fence 10 showing the adapter mount 36 extrusion bolted to the clamp block 34 extrusion clamped to the front fence rail 20 which is bolted to a cast iron table 13. The rip fence extrusion is secured to the adapter mount 36 extrusion. This drawing shows the double yoke extrusion 36 bolted at an angle to the edge of the clamp block extrusion. The rip fence extrusion angles to the right.

Figure 31:
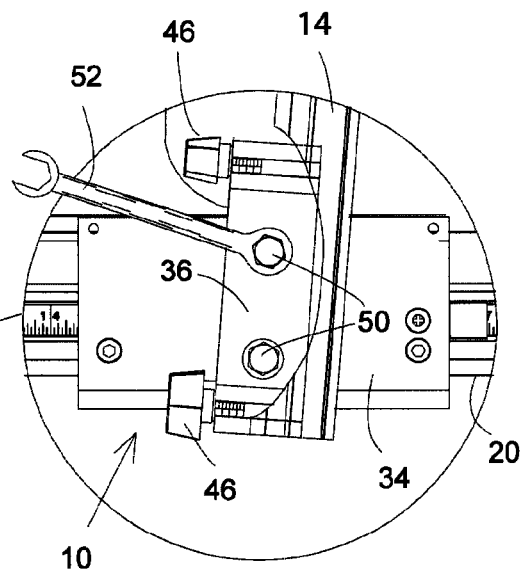
FIG. 31 is a top enlarged view of FIG. 30 showing the adapter mount extrusion bolted with the clamp block angled to the right so that the rip fence extrusion angles to the right. The rip fence L-track is cut away to show the front fence adjusting bolt secured with a wrench.

FIG. 31 is a top enlarged view of FIG. 30 showing the adapter mount 36 extrusion bolted with the clamp block 34 angled to the right thus the rip fence extrusion angles to the right. The rip fence L-track is cut away to show the front fence adjusting bolt 50 secured with a wrench 52.

Figure 32:
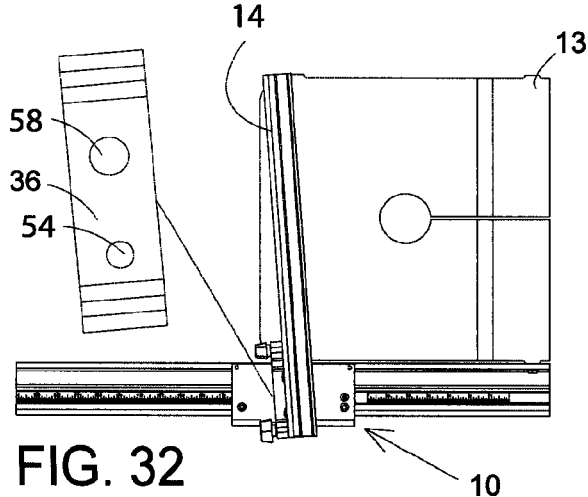
FIG. 32 is similar to FIG. 30 and FIG. 31 but with the fence adjusted so that it angles to the left.
Figure 33:
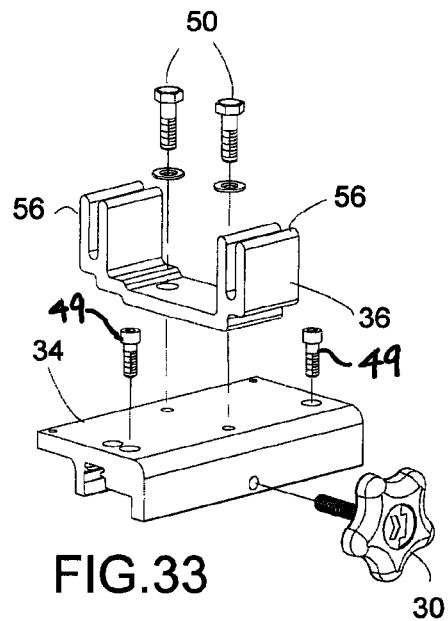
FIG. 33 is an exploded view of the rip fence assembly showing the adapter mount extrusion and the clamp block extrusion clamped with leveling screws on each side of the clamp block.

FIG. 32 is similar to FIG. 30 and FIG. 31 but with the fence 14 adjusted so that it angles to the left;

FIG. 33 is an exploded view of the rip fence assembly showing the adapter mount 36 extrusion and the clamp block 34 extrusion clamped with the leveling screws 49 on each side of the clamp block 34.

Figure 34:
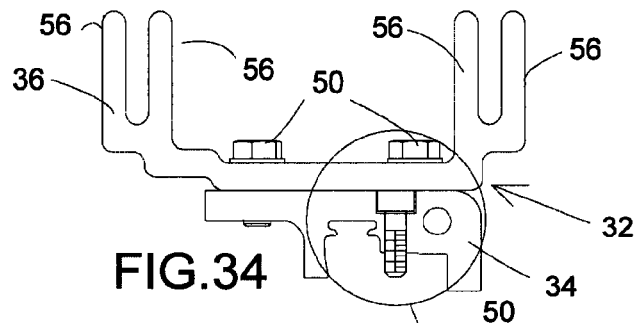
FIG. 34 is an elevation end view of the rip fence assembly showing the adapter mount extrusion and the clamp block extrusion clamped with a ¼-20 leveling screw installed in the clamp block.

FIG. 34 is an elevation end view of the rip fence bracket assembly 32 showing the adapter mount 36 extrusion and the clamp block extrusion 34 clamped with a ¼-20 leveling screw 49 installed in the clamp block 34.

Figure 35:
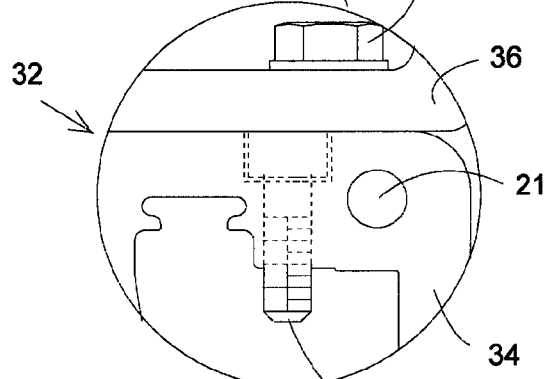
FIG. 35 is a detail view of FIG. 34.

FIG. 35 is a detail view of FIG. 34 showing the adapter mount 36 extrusion and the clamp block extrusion 34 clamped with a ¼-20 leveling screw 49 installed in the clamp block 34. Also shown in the clamp block 34. is the threaded hole 21 for the microadjuster 74.

Figure 36:
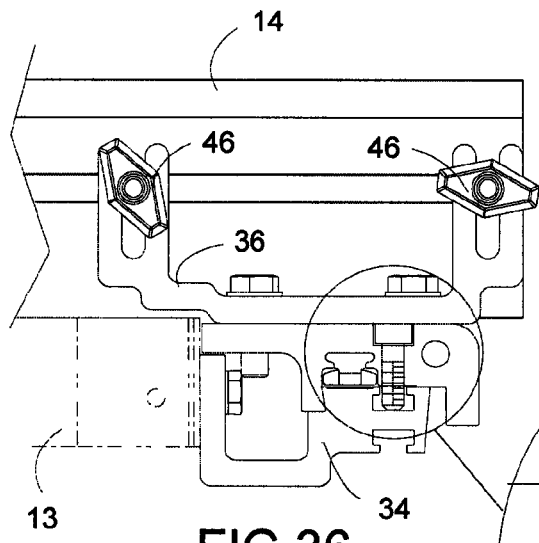
FIG. 36 is an elevation end view of the rip fence assembly showing the adapter mount extrusion and the clamp block extrusion clamped with a ¼-20 leveling screw installed in the clamp block and contacting the bottom of the T-slot in the fence rail.

FIG. 36 is an elevation end view of the rip fence bracket assembly 32 showing the adapter mount 36 extrusion and the clamp block 34 with a ¼-20 leveling screw 49 installed in the clamp block and contacting the bottom of the T-slot 24 in the fence rail 20. By lowering the leveling screws 49 until they are contacting the bottom of the T-slot 24 in the fence rail 20, the fence can ride on the leveling screws 49 and avoid the noise of metal to metal contact. The fence extrusion 14 is secured to the adapter mount 36 with bolts located in the L-shaped fence back T-slot 62 and tightened with two plastic ¼-20 knobs 46.

Figure 37:
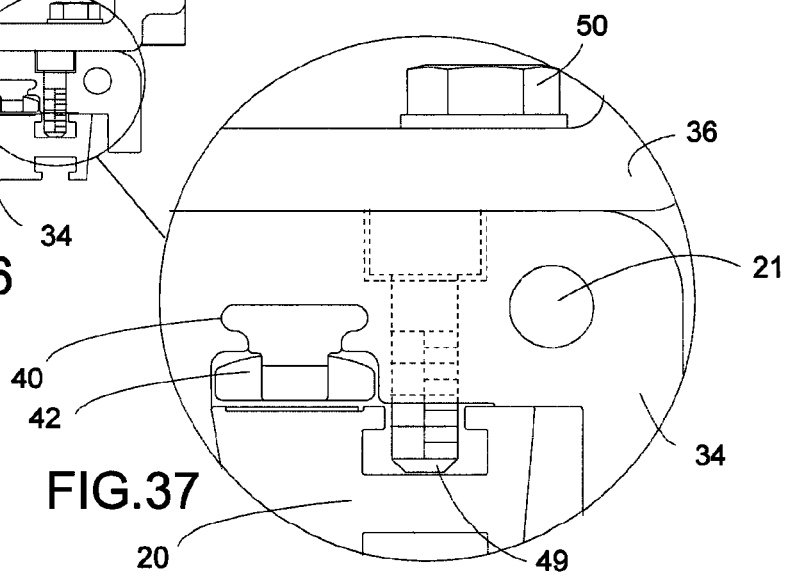
FIG. 37 is a detail view of FIG. 36.

FIG. 37 is a detail view of FIG. 36 showing the adapter mount 36 extrusion and the clamp block extrusion 34 with a ¼-20 leveling screw 49 installed in the clamp block and contacting the bottom of the T-slot 24 in the fence rail 20.

FIG. 38 is a top view of the rip fence 10 of the invention positioned on the U-shaped dovetail track 20 as it is used on a cast iron band saw table 13 shown with the ¼-20 leveling screws 49 installed in the clamp block 34.

FIG. 39 is a detail view of FIG. 38 showing the leveling screw 49 on the side of the clamp block 34.

FIG. 40 is a front view of the rip fence 14 of the invention positioned on the U-shaped dovetail track 20 as it is used on a cast iron machine table 13 as shown in FIG. 39.

FIG. 41 is a detail view of FIG. 40 showing an allen wrench 51 in one of the ¼-20 leveling screws 49 installed in the clamp block 34 for adjusting the fence angle. Nylon socket head cap screws work well as the leveling screws 49.

FIG. 42 is an elevation end view of the rip fence bracket assembly 32 showing the adapter mount 36 extrusion and the clamp block 34 extrusion angled in relationship to the front rail 20. The ability to change the fence 14 angle quickly is useful with the band saw 12 because the top guide post rarely moves straight up and down square to the table. Rather than moving the table the fence can easily be positioned parallel to the blade by adjusting one of the leveling screws 49.

FIG. 43 is a perspective view of the rip fence 10 of the invention positioned on the U-shaped rail 20.

FIG. 44 is an enlarged detail view of FIG. 43 of the rip fence 10 of the invention positioned on the U-shaped dovetail track 20 with the stick-on tape 44 located under the magnification lens 42. The lens position is adjustable and is locked in place with a lens screw 72.

FIG. 45 is an exploded perspective view of the clamp block extrusion 34, the stick-on tape 44, the magnification lens 42, and the U-shaped dovetail track 20. An oval slot for the lens 40 is located in the bottom clamp block extrusion 34. The magnifier 42 can be molded of transparent plastic and be configured so as to fit in a slot 40 in the end of the clamp block 34 and be secured therein by a fastener 72 so that the fastener 72 can be loosened and the magnifier 42 can be adjusted linearly so as to make fine adjustments in the measurements indicated by the magnifier 42.

FIG. 46 is a detail view of the magnification lens 42 shown in FIG. 45. The magnification lens 42 is molded of transparent plastic with a red line on the bottom of it for easily aligning the fence to the ruler.

FIG. 47 is a perspective view of the rip fence 10 of the invention positioned on the U-shaped dovetail track 20 with the fence microadjuster 74 screwed into the side of the clamp block extrusion 34.

FIG. 48A is a detail view of FIG. 47 with the fence microadjuster 74 screwed into the side of the clamp block extrusion 34 and secured to the top T-slot 24 of the U-shaped dovetail track 20 with a plastic ¼-20 knob 46. The T-slot allows the use of a position stop or a microadjuster 74 for moving the fence in accurate small increments. The microadjuster 74 has a screw 77 that is threaded into the side of the clamp block extrusion 34. The tighten knob 30 on the front of the clamp block extrusion 34 is loosened enough so that the microadjuster knurled knob 76 can be rotated, to rotate the screw 77 and thereby move the fence 14 in small increments.

Figures 49, 50:
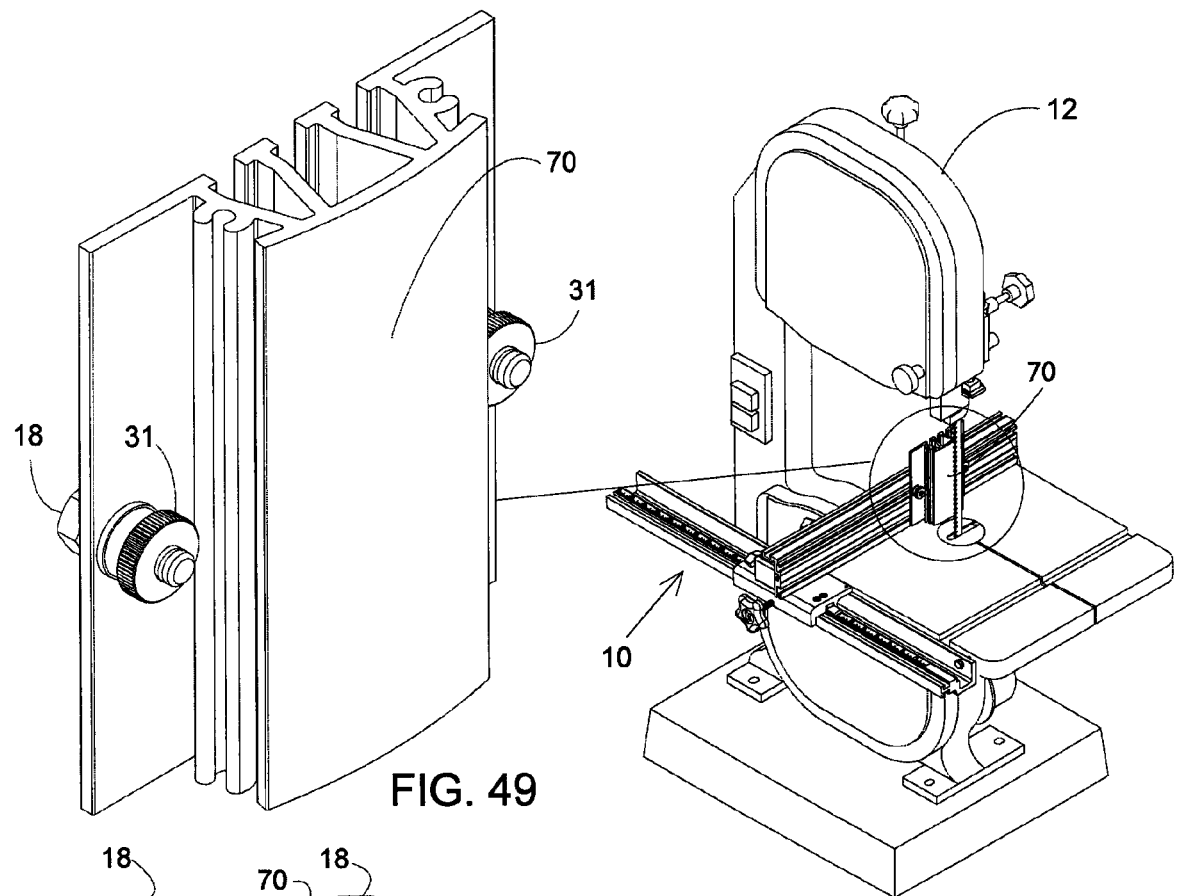
FIG. 49 is an exploded perspective view of the resaw guide extrusion.
FIG. 50 is a perspective view of the rip fence as it is used on a band saw with the resaw guide extrusion attached to the rip fence extrusion.

FIG. 49 is an exploded perspective view of the resaw guide extrusion 70 which has a flat back and a curved side. In a hole on each side is a bolt 18 secured with a knurled thumb nut 31.

FIG. 50 is a perspective view of the rip fence 10 as it is used on a band saw 12 with the resaw guide extrusion 70 attached to the rip fence extrusion 14.

Figures 51, 52, 53, 54:
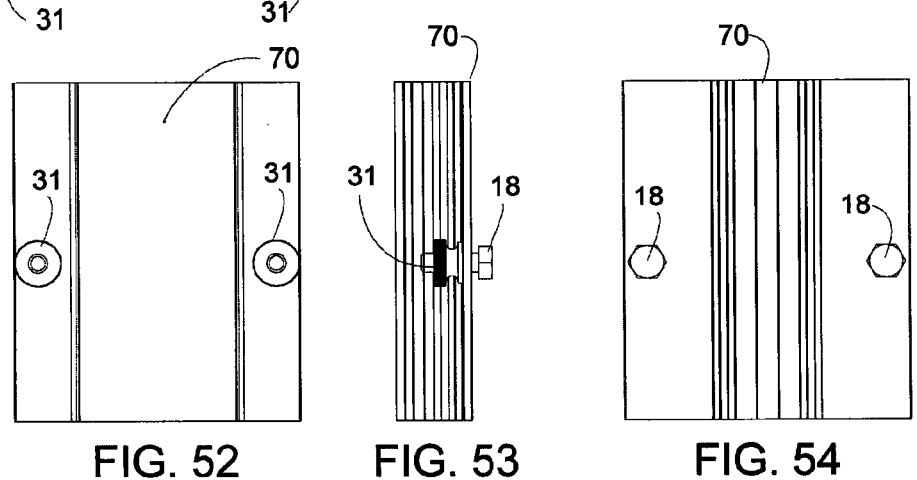
FIG. 51 is an end elevation view of the resaw guide.
FIG. 52 is a front elevation view of the resaw guide.
FIG. 53 is a side elevation view of the resaw guide.
FIG. 54 is a back elevation view of the resaw guide.

FIG. 51 is an end elevation view of the resaw guide 70.
FIG. 52 is a front elevation view of the resaw guide 70.
FIG. 53 is a side elevation view of the resaw guide 70.
FIG. 54 is a back elevation view of the resaw guide 70.
FIG. 55 is a perspective view of the rip fence 14 as it is used on a band saw 12 with the resaw guide extrusion 70 attached to the rip fence 14 and shown cutting a thick piece of wood 73 (FIG. 58).

FIG. 56 is an end elevation view of the resaw guide 70 with the blade 27 located slightly behind the midpoint of the apex of the curve 89. The workpiece 73 contacts the apex of the curve 89 of the resaw guide 70 before contacting the blade. The apex of the curve 89 functions as a fulcrum point allowing the workpiece 73 to be angled slightly as it is fed into the blade 27. Because the apex of the curve 89 is the only contact line of the workpiece 73, the workpiece can be accurately cut in width. Because the workpiece 73 is not resting against the fence, the problems associated with blade lead are attenuated or negated.

FIG. 57 is a side elevation view of FIG. 56 showing the resaw guide 70 with the blade 27 located slightly behind the midpoint of the apex 89 of the curve. The workpiece 73 contacts at or near the apex 89 of the curve of the resaw guide 70 before contacting the blade 27.

FIG. 58 is a detail view of FIG. 55.

Figure 59:
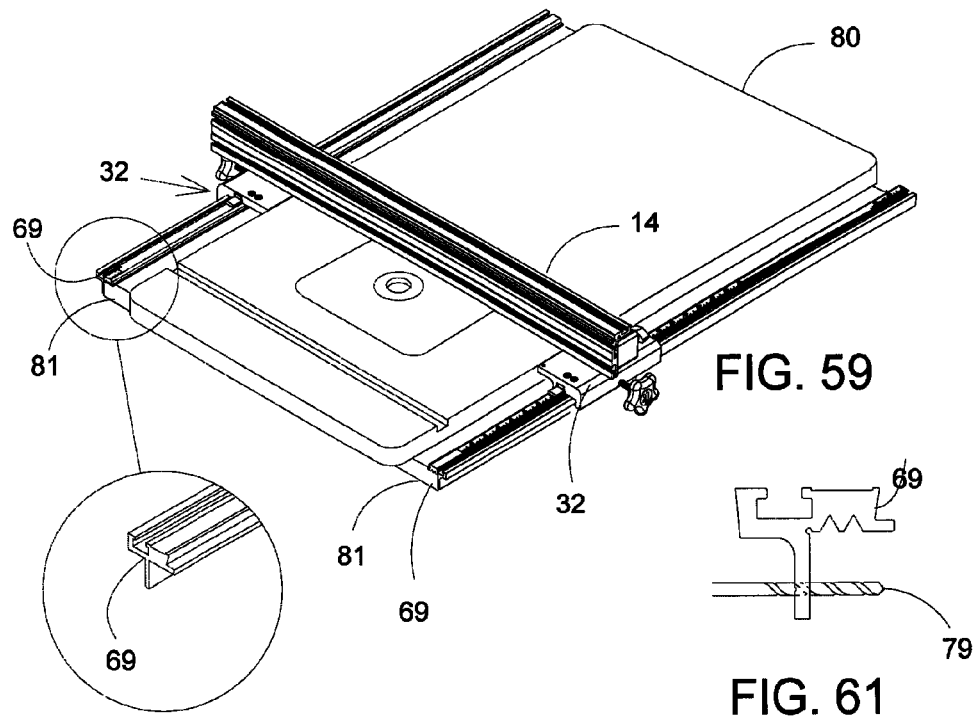
FIG. 59 is a perspective view of the rip fence of the invention as it is used on a standard 1⅛" router table with a rip fence bracket assembly located on the track on the front and back of the router table.

FIG. 59 is a perspective view of the rip fence 10 of the invention as it is used on a standard 1⅛" router table 80 with a rip fence bracket assembly 32 located on the track 14 on the front and back of the router table 80. The rail 69 is different from the rail that was used on the band saw. The T-shaped track 69 may be used as the fence mounting rail on a shop made table. This T-shaped track 69 extrusion design is disclosed in U.S. Patent Publication No. US20050056345 A1 and is now used as a rip fence front and back rail extrusion. This design is especially useful for attachment to a router table with a 1⅛" top.

Figure 60:
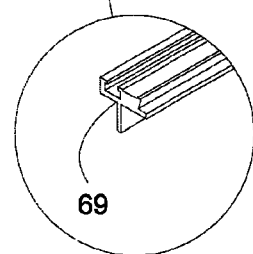
FIG. 60 is a detail view of the track of U.S. Patent Publication No. US2005 0056345 A1.

FIG. 60 is a detail view of the T-shaped track 69 extrusion of U.S. Patent Publication No. US2005 0056345 A.

Figure 61:
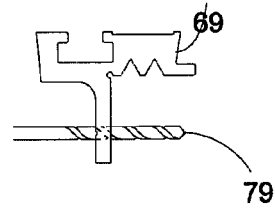
FIG. 61 is an end view of the track of U.S. Patent Publication No. US2005 0056345 A1.

FIG. 61 is an end view of the T-shaped track 69 extrusion of U.S. Patent Publication No. US2005 0056345 A1 showing how the mounting holes are drilled with a standard drill bit 79.

Figure 62:
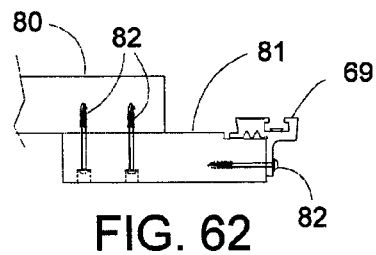
FIG. 62 is an end view of the track of U.S. Patent Publication No. US2005 0056345 A1 attached to a wood spacer block screwed to the bottom on the router table.

FIG. 62 is an end view of the T-shaped track 69 extrusion of U.S. Patent Publication No. US2005 0056345 A1 attached to a wood spacer block 81 screwed to the bottom on the router table 80.

Figure 63:
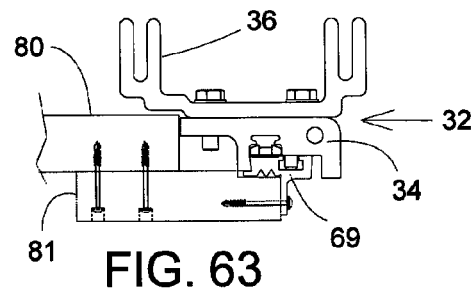
FIG. 63 is an end view of the track of U.S. Patent Publication No. US2005 0056345 A1 with the rip fence bracket assembly located on the track.

FIG. 63 is an end view of the T-shaped track 69 extrusion of U.S. Patent Publication No. US2005 0056345 A1 with the rip fence bracket assembly 32 located on the T-shaped track 69 extrusion.

Figure 64:
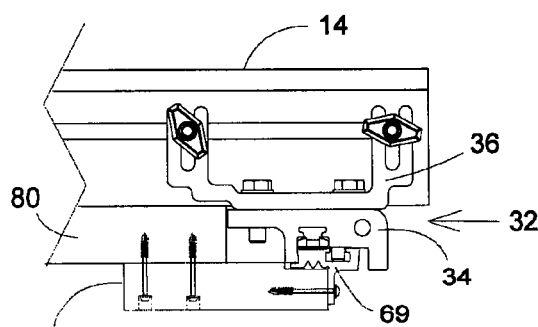
FIG. 64 is an end view of FIG. 63 showing the double yoke extrusion with the L-shaped rip fence track extrusion attached to it with two bolts and plastic knobs.

FIG. 64 is an end view of FIG. 63 showing the adapter mount 36 extrusion with the L-shaped rip fence track 14 extrusion attached to it with two bolts 18 and plastic knobs 46.

Figure 65:
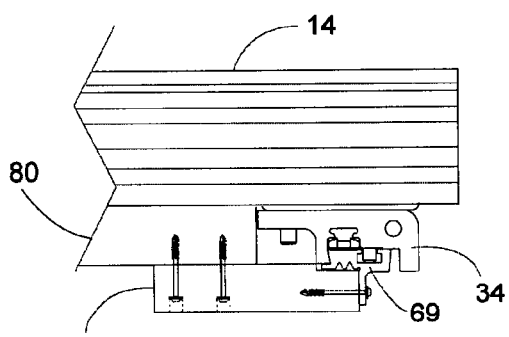
FIG. 65 is an end view of FIG. 63 showing the double yoke extrusion with the L-shaped rip fence track extrusion attached to it as shown in FIG. 59.

FIG. 65 is an end view of FIG. 63 showing the adapter mount 36 extrusion with the L-shaped rip fence track extrusion attached to it as shown in FIG. 59.

FIG. 66 is a perspective view of the rip fence of the invention as it is used on a standard 1⅛" router table 80 with the rip fence bracket assembly 32 located on the custom fence extrusion 84 on the front and back of the router table.

FIG. 67 is a detail view of the custom fence rail track extrusion 84 designed for a standard 1⅛" router table 80. The rail 84 extrusion is generally flat with the same top profile as the U-shaped rail 20 which includes an angled lip (dovetail) surface 26, a ruler indentation next to the top T-slot, and a top T-slot 24 useful for mounting the microadjuster 74 which is very useful with the router table for very accurately making fine fence adjustments.

FIG. 68 is an end view of FIGS. 66 and 67 with the rip fence bracket assembly 32 located on the custom fence 84 extrusion on the front of the router table 80.

FIG. 69 is an end view of the custom fence 84 extrusion for the front and back fence rail of the standard 1⅛" router table 80 as illustrated in FIG. 66. The fence extrusion 84 for the standard 1⅛" router table 80 is designed to screw to the bottom of the router table 80.

FIG. 70A is a perspective view of a router table 80 design with multiple holes 85 and oblong slots 86 for use as a router table 80 and a work station. The router table plate 83 is located in the middle of the router table 80. An option that makes the router table 80 more useful is a circular saw table plate 87 as shown in FIG. 70B which allows the use of a circular blade 91.

Figure 70:
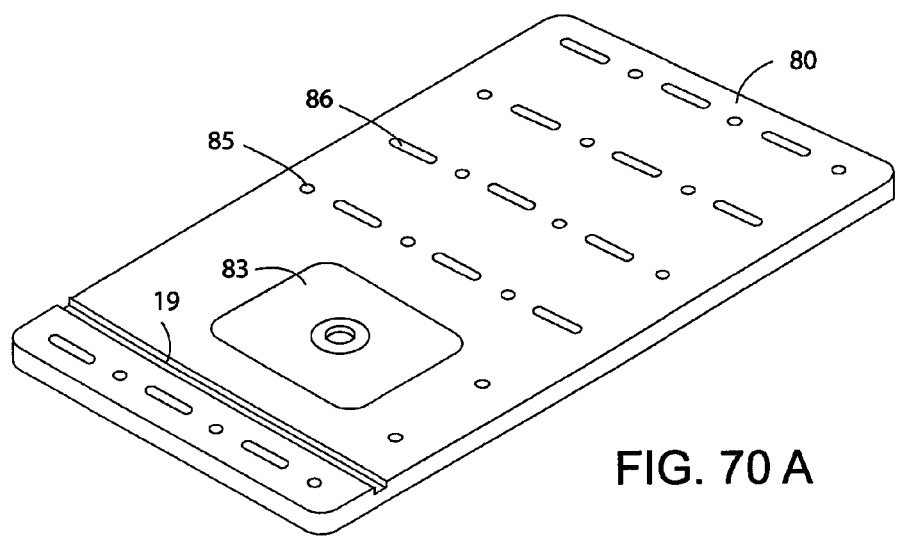
FIG. 70A is a perspective view of a router table design with multiple holes and slots for use as a router table and a work station.
FIG. 70B is a perspective view of a router table plate designed for a circular saw.
Figure 70:
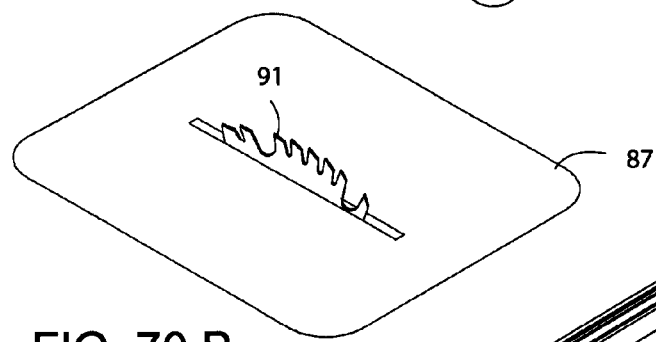
Figure 71:
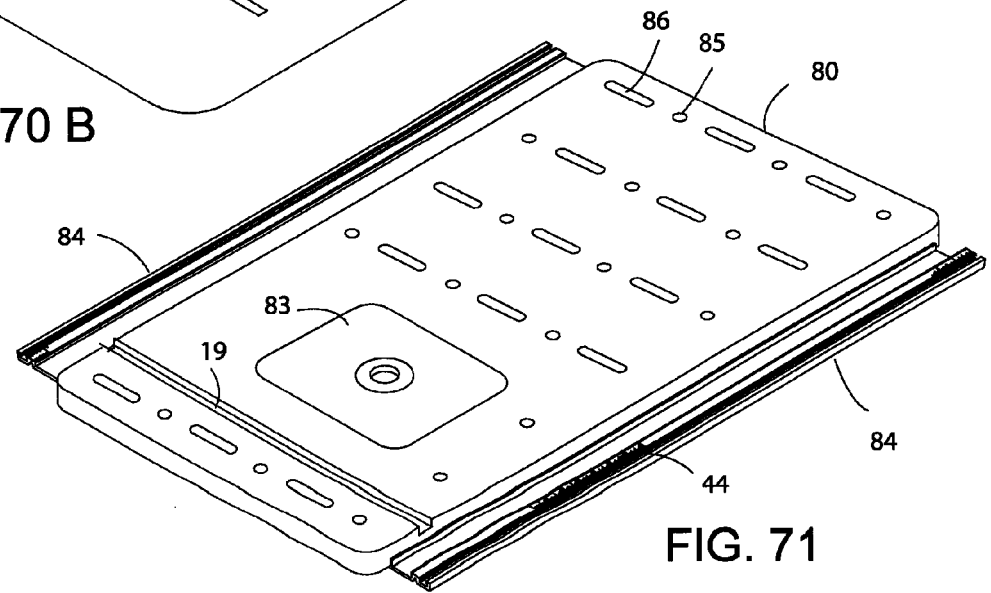
FIG. 71 is a perspective view of the router table design shown in FIG. 70 with the custom rail extrusions show in FIG. 69.

FIG. 71 is a perspective view of the 1⅛" router table 80 design shown in FIG. 70 with the custom extrusions 84 shown in FIG. 69.

Figure 72:
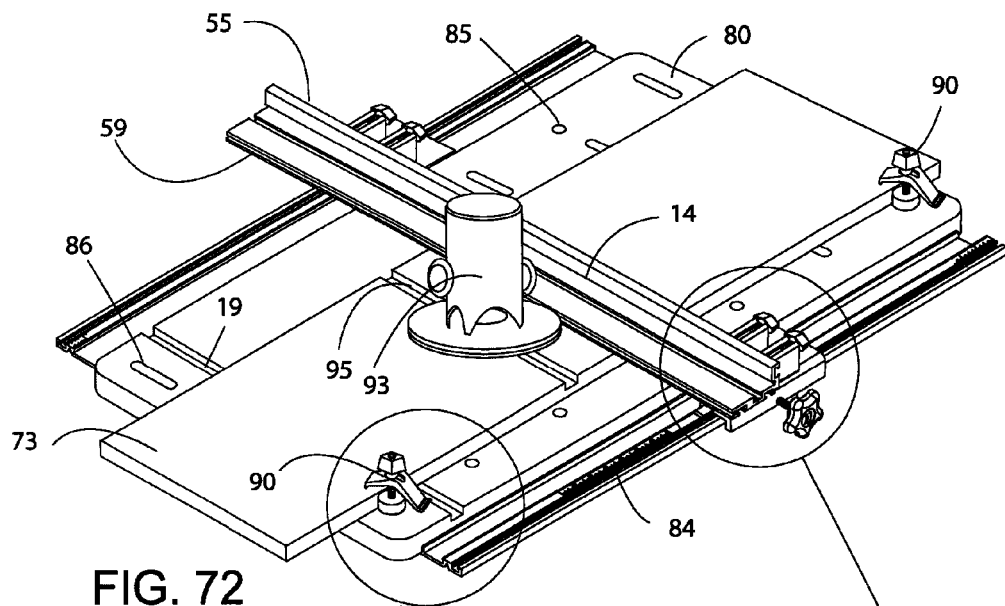
FIG. 72 is a perspective view of the rip fence of the invention as it is used as a router guide on the table shown in FIG. 71.

FIG. 72 is a perspective view of the router table 80 with the rip fence 14 of the invention with the long leg 59 of the fence extrusion 14 resting on the workpiece 73 as it is used as a router 93 guide on the router table 80. The workpiece 73 is secured to the router table 80 with clamps 90 located in the holes 85 in the router table 80. This arrangement is particularly useful for cutting a dado 95 in a wide workpiece 73 with a router 93.

Figure 73:
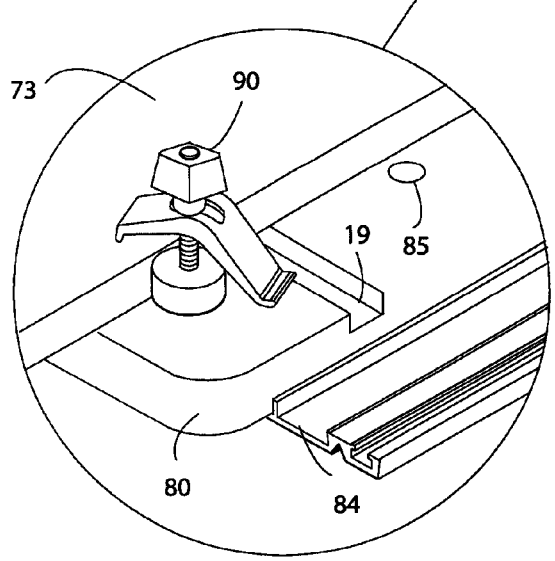
FIG. 73 is a detail view of the clamp used to secure the workpiece to the custom designed 1⅛" router table.

FIG. 73 is a detail view of the clamp 90 used to secure the workpiece 73 to the 1⅛" router table 80.

Figure 74:
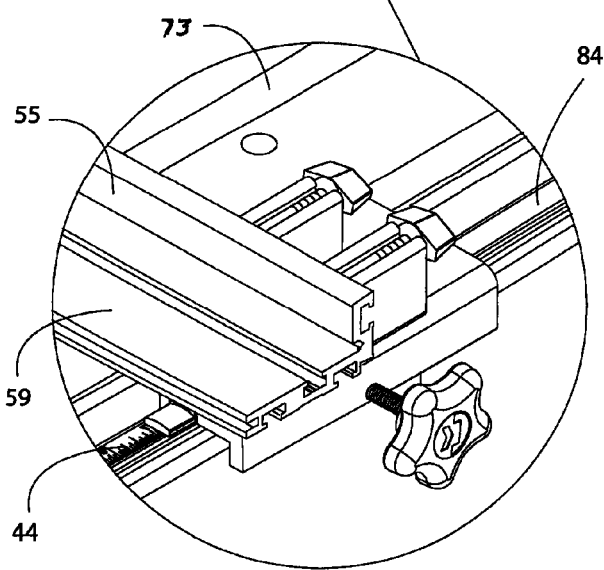
FIG. 74 is a detail view of the rip fence assembly shown in FIG. 72 with the fence extrusion in the low position.

FIG. 74 is a detail view of the rip fence bracket assembly 32 shown in FIG. 72 with the fence extrusion in the low position with the long leg 59 of the fence extrusion 14 resting on the workpiece 73 as it is used as a router 93 guide on the router table 80.

Figure 75:
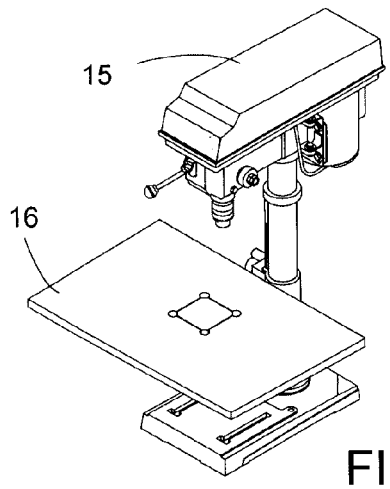
FIG. 75 is a perspective view of a drill press with a ¾" shop made table.

FIG. 75 is a perspective view of a drill press 15 with a ¾" thick shop made table 16.

Figure 76:
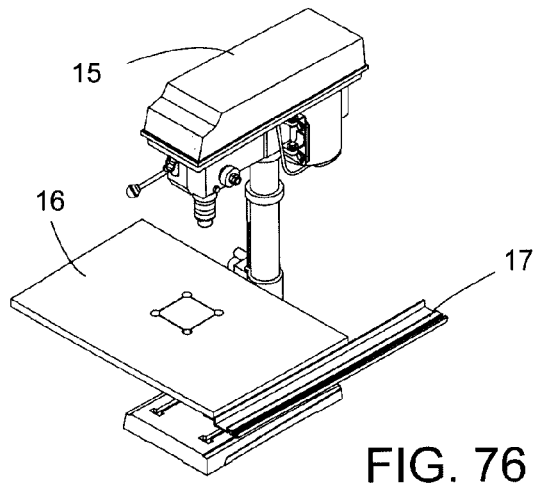
FIG. 76 is a perspective view of a drill press with a shop made table with a customized generally flat rail extrusion added to the edge of the ¾" table.

FIG. 76 is a perspective view of a drill press 15 with a shop made table 16 with a generally flat customized rail 17 extrusion for ¾" material added to the edge of the ¾" table.

Figure 77:
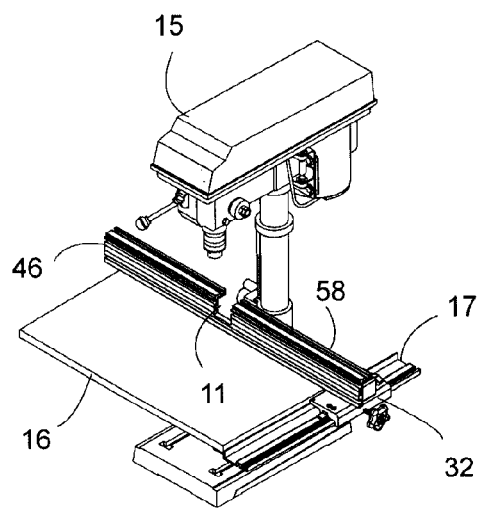
FIG. 77 is a perspective view of the rip fence of the invention positioned on the drill press of FIG. 76.

FIG. 77 is a perspective view of the rip fence 10 of the invention positioned on a drill press 15 with a ¾" shop made table 16 with a rail extrusion 17 added to the edge of the table. The fence is the same fence extrusion 14 but it has been modified by adding a machined drill press cut-out 11 which gives clearance for the chuck of the drill press.

Figure 78:
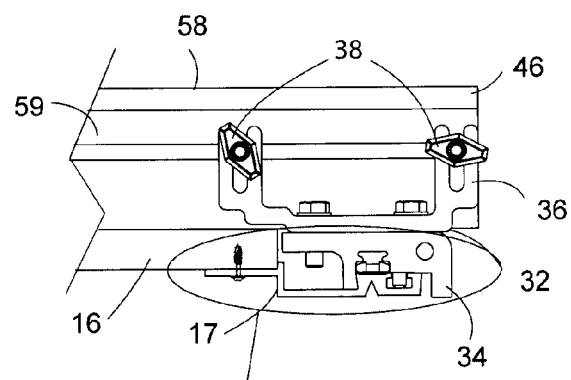
FIG. 78 is an end view of the rip fence assembly located on the custom fence extrusion on the front of the ¾" drill press table of FIGS. 76 and 77.

FIG. 78 is an end view of the rip fence bracket assembly 32 located on the ¾" material fence extrusion 17 on the front of the ¾" drill press table 16.

Figure 79:
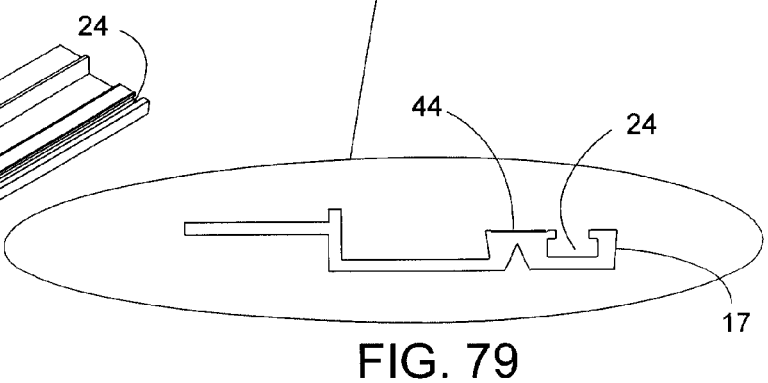
FIG. 79 is an end view of the custom fence extrusion of FIGS. 76-78.

FIG. 79 is an end view of the ¾" material fence extrusion 17 for the front fence rail of the standard ¾" shop made table 16.

Figure 80:
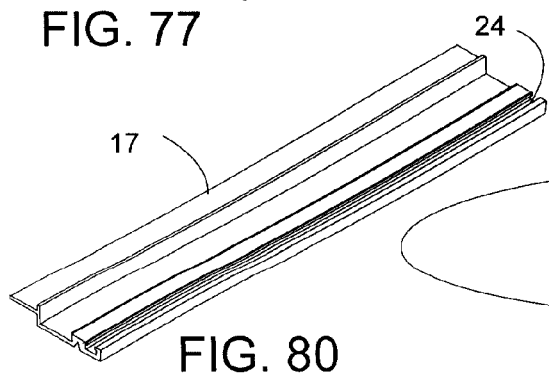
FIG. 80 is a perspective view of the custom fence extrusion of FIGS. 76-79.

FIG. 80 is a perspective view of the generally flat rail 17 extrusion for the front fence rail of the standard ¾" shop made table 16.

Figure 81:
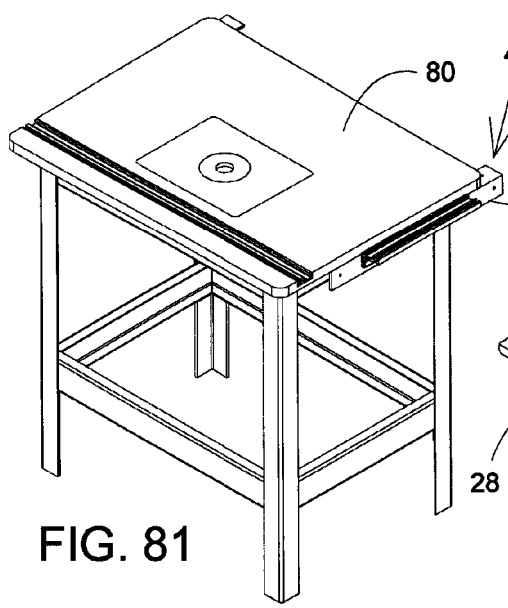
FIG. 81 is a perspective view of a router table with a 1⅛" shop made table top with an adjustable height fence rail.

FIG. 81 is a perspective view of a router table with a 1⅛" shop made table top with an adjustable height fence rail 41 that has vertical slots in its vertical flange for adjustably mounting a guide track rail to it.

Figure 82:
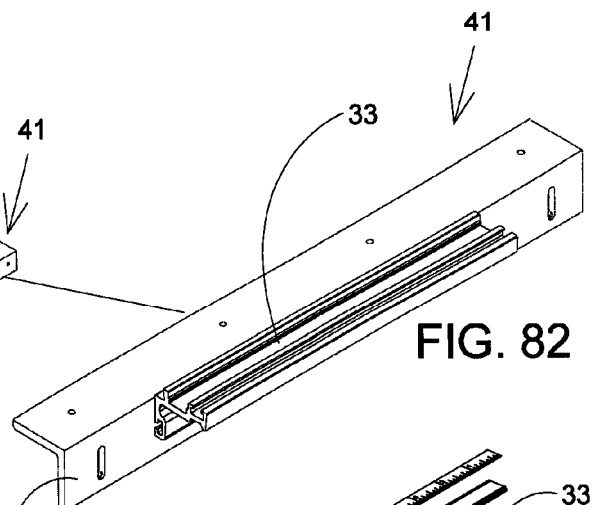
FIG. 82 is a detail view of the adjustable height fence rail.

FIG. 82 is a detail view of the adjustable height fence rail 41.

Figure 83:
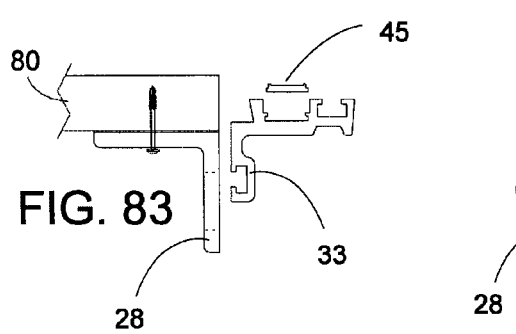
FIG. 83 is an end view of the adjustable height fence rail extrusions.

FIG. 83 is an end view of the adjustable height fence rail extrusions 41 showing the adjustable ruler extrusion 45, the L-shaped fence rail 33 and the L-shaped extrusion 28.

Figure 84:
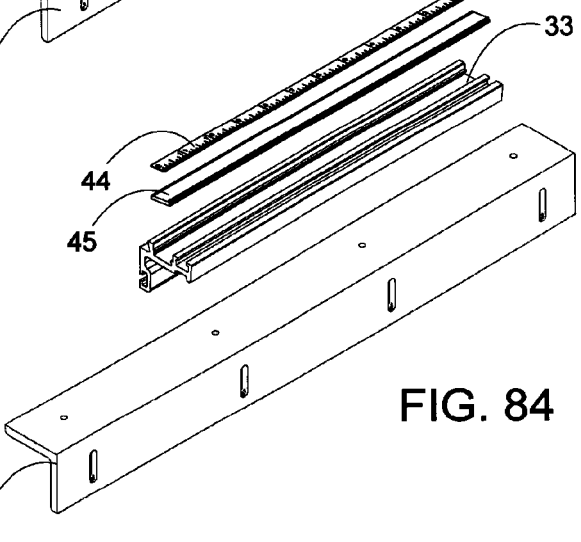
FIG. 84 is an exploded view of the adjustable height fence rail extrusions.

FIG. 84 is an exploded view of the adjustable height fence rail extrusions showing the adjustable ruler extrusion 45, the L-shaped fence rail 33, the L-shaped extrusion 28 and the ruler 44.

Figure 85:
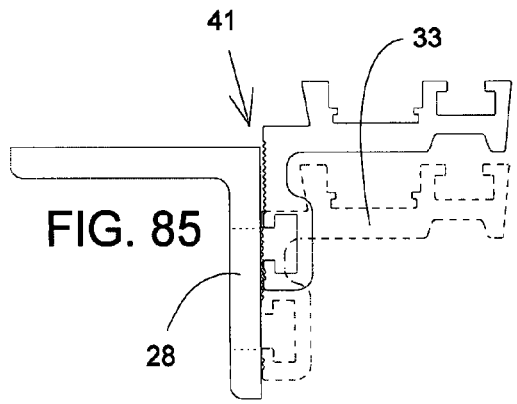
FIG. 85 is an end view of the adjustable height fence rail extrusions showing the upper and lower position on the L-shaped fence rail.

FIG. 85 is an end view of the adjustable height fence rail extrusions showing the upper and lower position on the L-shaped fence rail 33.

Figure 86:
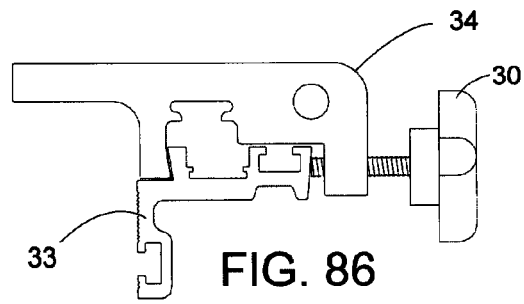
FIG. 86 is an end view of the adjustable height fence rail extrusions showing the L-shaped fence rail with the fence clamp bracket secured to it.

FIG. 86 is an end view of the adjustable height fence rail extrusions showing the L-shaped fence rail 33 with the fence clamp block 34 secured to it.

FIG. 87 is a perspective view of a router table with a 1⅛" shop made table top 80 with a cam fence bracket assembly 38 secured to the adjustable height fence rail 41. A box extrusion fence 65 is secured to the cam fence bracket assembly 38.

FIG. 88 is an enlarged view of the cam fence bracket assembly 38.

FIG. 89 is an exploded view of the cam fence bracket assembly 38 and the L-shaped fence adjustable height fence rail 41.

FIG. 90 is an enlarged exploded view of the cam fence bracket assembly 38 showing the cam clamp block bracket 35, cam lever 37, and the cam bracket double yoke adapter mount 39. In this embodiment the cam lever 37 acts as a fastener for securing the position of the clamp block 35 along the rail 33. Rotating the lever 37 down clamps the block 35 in position along the rail 33 and rotating it up frees it so it can be slid along the rail 33.

FIG. 91 is a end view of the cam fence bracket assembly 38 secured to the L-shaped fence rail 33 of adjustable height fence rail 41.

FIG. 92 is an exploded view of the cam fence bracket assembly 38 showing the cam clamp block 35, cam lever 37, and the cam bracket double yoke adapter mount 39.

FIG. 93A is a perspective view of the rip fence 10 of the invention positioned on the U-shaped dovetail track 20 as it is used on a band saw with the L-shaped fence 14 secured to the fence bracket assembly 32;

FIG. 93B is an enlarged view of the L-shaped fence 14.

FIG. 94A is a perspective view of the L-shaped fence 14 option available with this system.

FIG. 94B is a perspective view of the box shaped fence 65 option available with this system.

FIG. 95A is an enlarged view of the fence bracket assembly 32 and the L-shaped fence 14.

FIG. 95B is an end view of the fence bracket assembly 32.

FIG. 96A is a perspective view of the cam fence bracket assembly 38 secured to the adjustable height fence rail 41. A box shaped fence 65 is secured to the cam fence bracket assembly 41. The width of the auxiliary fence board secured to the front of the box shaped fence is equal to the distance the top leg extends from the lower part of the front face of the fence 65.

FIG. 96B is an end view of the cam fence bracket assembly 38.

FIG. 97A is a perspective view of the U-shaped fence rail 20.

FIG. 97B is a perspective view of the of the adjustable height fence rail assembly 41.

FIG. 97C is an end view of the T-shaped fence rail 69.

FIG. 97D is an end view of the generally flat 1⅛" material fence rail 84.

FIG. 97E is an end view of the of the ¾" material fence rail, which is also generally flat.

The invention provides an improved machinery fence system 10 for measuring and cutting pieces to width on woodworking or metal working machines such as a table saw, band saw, router and/or drill press.

The present invention also provides an improved fence system for cutting a profile on the edge, corner, bottom, or top of a workpiece when used on the router table or shaper. When used on the drill press, the improved fence helps to easily and very accurately locate the hole position or guide a workpiece past a sanding drum. The improved fence is a universal fence that can be used on a variety of machine tables such as cast iron table tops on machines or shop made tables such as used for the router or drill press. This improved fence can be used as a guide on most machines in the woodworking or metal-working shop simply by changing the rail that is attached to the machine.

The improved machinery fence system of the invention includes a section of track 20 that functions as a front rail to which the fence system is clamped. The rail 20 may have a T-slot 24 which is a longitudinal guide for releasably mounting accessories to the track. It may also have a T-slot 25 on the bottom, opposite T-slot 24, that may be used for mounting accessories or extending the rail 20 with another rail 20 by placing a mating piece in the T-slot 25 that connects the two rails 20.

An improvement of this fence system is the addition of an angled lip 26 to the front of the fence rail track, in front of the T-slot, facing in the direction of feeding into the blade 27 and also facing down. The angled lip, described as a half dovetail surface since the angle is a half dovetail angle (9 degrees is typical), is also a longitudinal guide for releasably mounting accessories such as the rip fence to the track. Accessories such as a rip fence with a matching angled surface 28 can be secured to the track using the dovetail surface 26 of the track, with a screw knob 30 on the back of the accessory that bears against the back, generally vertical, surface of the track to pull the angled surface of the accessory against the dovetail surface of the track. The angle of the dovetail surface is angled downward, so that it tends to slide the rip fence downward toward the track and therefore hold it on the front rail track. The mating angled dovetail surfaces allow easy assembly of the rip fence to the front rail track, and particularly allow assembly from the top of the track (as opposed to the ends, like with a T-slot). The mating dovetails also provide a very stable mounting platform, particularly if the accessories are relatively wide, to provide a long length of mating angled surfaces.

An angled half dovetail fence clamp block 34, to which the fence extrusion is secured by means of a double yoke adapter mount extrusion 36, is mounted to the front rail 20 and is slidable longitudinally and securable at multiple alternative positions along the track rail 20.

The rip fence is adjustable parallel to the blade of the band saw 12 or tablesaw and is used to guide the workpiece 73 into the blade. The fence extrusion 14 is secured to the fence bracket assembly 32 which clamps to the fence rail 20 that is attached to the front of the machine or shop made table. The fence bracket assembly 32 is made from two extrusions which are bolted together with two ⁵⁄₁₆" bolts 50. The bottom extrusion is the clamp block 34 which has the half dovetail profile 29 on the bottom of it that engages the half dovetail on the front rail 26. The clamp block of the fence bracket is secured to the fence track by a screw knob 30 at the back of the extrusion which applies pressure to the rear edge of the rail track 20 so as to clamp the mating half dovetail surfaces together. An oval slot 40 in the clamp block extrusion 34 allows for the addition of a magnifier 42 for easily setting the fence position accurately, reading the ruler 44 through the magnifier at the edge of the fence bracket.

Bolted to the top of the clamp block 34 is the double yoke dapter mount extrusion 36 which has a yoke at the front and back which accepts the ¼-20 bolts that secure the fence extrusion to the fence bracket. The front and back yokes are two fingers that are parallel to each other so as to define an accessory attachment slot so that the fence extrusion 14 can easily be locked to the fence bracket by placing a bolt into the slot between the fingers. The fence extrusion 14 can be locked to the mount 36 by turning the knobs 46 on the bolts 18.

The double yoke extrusion 36 is bolted to the top of the clamp block 34 to form the fence bracket assembly 32. The two extrusions are bolted together with two ⁵⁄₁₆" bolts 50 located in holes in the bottom of the double yoke extrusion. The front hole 58 (FIG. 26) is oversized which allows the double yoke extrusion 36 to be adjusted square to the edge of the clamp block 34 or easily adjusted out of square as is required when adjusting a band saw fence out of square to compensate for blade lead.

The cam fence bracket assembly 38 is similar in design and function but is different in that it clamps to the fence rail with a cam lever 37 rather than a knob. Rotating the lever 37 down cams it against the rail 20 to generate the clamping force.

The fence extrusion is an L-shaped track 14 with four T-slots designed with the half dovetail 60 on the front (facing forward and downward) and a T-slot 62 on the back (opening backward) and/or a T-slot 64 on top opening upward, and two T-slots 66 and 68 opening toward the front. This extrusion design is disclosed in U.S. Patent Publication No. US20050056345 A1 which is hereby incorporated by reference for its disclosure thereof and is now used as a rip fence extrusion rather than a cross cut fence.

This L-shaped fence design is especially useful for the band saw rip fence because attachments such as a circle jig (FIG. 87), a resaw guide or a stop can easily be attached.

The box extrusion fence 65 (FIG. 94B) can be used to replace L-shaped track 14 for more industrial applications such as a router table fence or a shaper fence.

In another useful aspect for use on a band saw, a light weight resaw guide 70 (FIG. 49) is secured to the rip fence extrusion, using the accessory attachment front T-slot, with two bolts and thumb nuts. The resaw guide is a curved extrusion that is designed to support the face of a board as it is cut on the band saw.

The curved resaw guide 70 fixture has two holes on each side of it so that it can be bolted to the T-slot in the fence 14 so it can be easily slid relative to the blade so as to readjust its position to accommodate the width of different blades. The apex of the curve 89 of the curved resaw guide 70 fixture should be positioned about ¼" in front of the blade so the workpiece 73 can be angled slightly as it is fed into the band saw blade 27.

The front rail 20 which is mounted on the front of the machine with a cast iron table can be generally U-shaped with the half dovetail 26 on the front leg of the U, facing rearwardly, and a T-slot forward of it, opening upwardly, and a vertically extending flange at the rear leg of the U. The I-slot allows the use of a position stop or as microadjuster 74 (FIG. 47) for moving the fence in accurate small increments. The upward flange section of the track makes it easy to mount the front rail track to a cast iron machine table. This design is especially useful with a band saw 12 or a shaper. One version of the rail has holes 78 (FIG. 45) machined to mate with the threaded holes on the front of popular brand band saw tables so that the purchaser can bolt the rail to his/her saw without having to do any fabrication.

The T-shaped track may be used as the fence mounting rail on a shop made table. This extrusion design is disclosed in U.S. Patent Publication No. US20050056345 A1 and is now used as a rip fence front rail extrusion. This design is especially useful for attachment to a router table with a 1⅛" top.

In another useful aspect, a lightweight fence rail extrusion is secured to either a ¾" or a 1⅛" shop made table. The fence rail extrusions (FIGS. 60, 69, or 79) have the same top half dovetail and T-slot profile as the previously shown extrusions but different profiles. Some (FIGS. 69 and 79) have a wide flange for screwing the extrusion to the bottom of a shop made table. A small flange rests against the front of the shop made table and helps to register the extrusion parallel with the edge of the table. One (FIG. 69) fence rail extrusion is designed for a table with a 1.125" top which is popular with router tables. Another extrusion (FIG. 79) is designed for a table with a 0.750" top and has an offset rather than flat bottom.

In another useful aspect, an optional extruded front rail assembly 41 which is adjustable in height via adjustment slots is provided for attaching the fence to shop made tables between 0.750" and 1.5" in thickness.

The invention therefore provides a universal machinery fence system that has a rail for attachment to a work table of a workpiece material removal machine and the rail defines a track. A clamp block 34 is releasably assembled to the rail 20 with surfaces that mate with the track of the rail to guide, the clamp block linearly along the rail. The clamp block includes a fastener for securing the position of the clamp block along the rail. The system also includes a fence 14 and an adapter mount 36. The adapter mount 36 is fastened to the clamp block 34 and is also fastened to the fence 14, with the fence running generally perpendicular to the rail 20.

The rail can be in any of a number of configurations attached to different types of workpiece material removal machines. These include a U-shaped rail 20 that has mounting holes in one leg of the U and has the track defined on the other leg of the U. This configuration is for mounting to the side surface of the work table. In other configurations, the rail is T-shaped 69 for mounting to a corner (FIG. 60, for example), generally flat for mounting to the bottom of a table (FIG. 67), or generally flat with a step up (FIG. 79) for mounting to the bottom of a thinner table.

In any of the rail configurations, it is also useful to include a T-slot 24 which can serve as a guide for a stop to "remember" the position of the clamp block along the rail, or for a microadjuster (FIG. 48) to make fine adjustments in the linear position of the clamp block along the rail. A T-slot 25 can also be provided in the bottom surface of the rail as may be useful for connecting two of the rails together end-to-end or for other applications.

In another aspect, leveling screws 49 (FIG. 37) can be provided threaded into the clamp block through the top of the clamp block and down so as to seat with their ends against the rail, preferably in the bottom of a T-slot 24 provided in the top of the rail. The leveling screws 49 can be turned so as to adjust the angle of the clamp block relative to the rail which also has the effect of adjusting the angle of the fence relative to the cutter of the machine. These can be useful to place the working plane of the fence exactly parallel to the cutting plane of the cutter or to place it at a different angle relative to the cutting plane.

In another aspect, the adapter mount 36 is secured to the clamping block 34 with fasteners 50 that are threaded into the clamping block about a vertical axis. The fasteners extend through at least one hole 58 (FIG. 26) in the adapter mount that is oversized relative to the fastener so that the adapter mount can be either angled to extend perpendicular to the rail or it can be angled slightly to extend at a slight angle to the rail, which also has the effect of angling the fence relative to the rail and relative to the work table and cutter of the machine. This can be useful in setting up the machine and adjusting the fence relative to the cutter especially for the bandsaw.

In an especially preferred form, the adapter mount 36 has a double yoke configuration in which it defines two slots that are spaced apart in their direction parallel to the fence and that run generally perpendicularly to the fence. Two finger like projections 56 run parallel to each other creating the slot for a bolt 18. The bolts 18 for mounting the fence 14 extend through the slots and can be secured with thumb screws 46 on the rear side of the adapter mount. The bolt heads are received in a T-slot in the back of the fence 62 (FIG. 10), so that the fence is also adjustable linearly relative to the adapter mount, in a direction that is generally perpendicular to the direction of the rail. Preferably, the fence is L-shaped with T-slots on its top and front faces 14 for the mounting of accessories such as stops, microadjusters, and extension extrusions.

The rail, clamping block, adapter mount, and fence are all preferably made of extruded aluminum, and therefore, have profiles which are capable of being so made.

In an especially preferred form, the tracks of the rail 20 (FIG. 45), 41 (FIG. 82), 69 (FIG. 62), 84 (FIG. 73), 17 (FIG. 78), and the clamp block 34 have mating angled surfaces, preferably of a standard dovetail angle, with the angled surface on the rail 26 being angled so as to face downwardly and the mating surface on the clamp block 29 being angled at a mating angle and so as to face upwardly. A screw knob 30 opposite from the angled face of the clamp block 34 that is screwed into the clamp block 34 bears against the side of the track that is opposite from the angled face of the track so that when the screw knob is tightened, the two angled faces 26, 29 are forced into abutment with one another, which tends to hold the clamp block 34 down against the track. The edge of the rail that the screw knob 30 bears against is also preferably angled downwardly to hold the clamp block down. The screw knob 30 can be loosened to slide the clamp block 34 along the track and can be loosened even more until the two mating angled surfaces 26, 29 can clear one another so that the clamp block 34 can be lifted off of the rail, without having to run the clamp block 34 to one end or the other of the rail.

In another preferred aspect, the track rail 20 is provided with a ruler 44 on its top surface and the clamp block 34 mounts a magnifier 42 through which the demarcations on the ruler 44 can be viewed to make them more visible. The magnifier 42 can be molded of transparent plastic and be configured so as to fit in a slot 40 in the end of the clamp block 34 and be secured therein by a fastener 72 so that the fastener 72 can be loosened and the magnifier 42 can be adjusted linearly so as to make fine adjustments in the measurements indicated by the magnifier 42.

In another aspect, the invention provides a curved resaw guide 70 (FIG. 49). The curved resaw guide 70 can be mounted to the working face of the fence 14, for example, in the T-slots 66 in the working face 59 of the fence with bolts that have heads captured in the T-slots. In the vertical direction, the curved face extends generally parallel to the cutter, for example a band saw blade 27, and in the direction of feed, the saw guide 70 has a curved face that permits repositioning of the work in the feed direction by angling it against the convex curved face of the guide.

In another aspect of the invention, rails can be provided on both sides of the work table that are parallel and spaced apart from one another (FIGS. 59, 66 and 72). Similarly, a clamping block 34 can be assembled to each rail and an adapter mount 36 to each clamping block with a fence spanning both adapter mounts 36. This provides a fence that is rigidly fixed at both sides of the work table to provide a very rigid work face of the fence for guiding workpieces into the cutter. Rulers 44 can be provided on one or both rails for making accurate measurements, and the connection of the adapter mounts 36 to the clamp block 34 also permits some angling of the fence relative to the cutter and relative to the table.

In another form, the fence 14, being L-shaped, can be assembled to the adapter mount 36 in any of a number of orientations, including one in which the long leg 59 of the L is vertical (FIG. 1) and another in which the short leg of the L 55 is vertical (FIG. 72). Preferably, in at least one of these positions, there is a space created between the fence and the top surface of the table such that a workpiece can be slid into the space and an edge of the fence can be used to guide a tool such as a router 93 to make a cut in the piece that is slid between the fence and the work table. For example, the space between the fence and the work table may be advantageously chosen to be ¾", which is a common workpiece thickness. The T-slots on the fence would therefore be positioned so as to produce the desired spacing.

Preferred embodiments of the invention have been described in considerable detail. Many modifications and variations to the embodiments described will be apparent to those skilled in the art, which will still embody the invention.

I claim:

1. A universal machinery fence system for a work table of a workpiece material removal machine, comprising:
    a rail defining a guide track, the rail being attachable to the work table of the workpiece material removal machine having a material removal tool, wherein the rail includes an angled surface that faces downwardly and extends the length of the rail and an opposing surface opposite the angled surface that also extends the length of the rail, wherein a cross-section of the rail between the angled surface and the opposing surface is thinner at a downward portion of the cross-section of the rail than at an upward portion of the cross section of the rail as measured horizontally from the angled surface to the opposing surface;
    a clamp block positionable along the rail, wherein the clamp block includes a mating angled surface that faces upwardly and is configured to mate with the angled surface of the rail wherein a profile of the mating angled surface of the clamp block matches a profile of the angled surface of the rail in a complimentary fashion;
    a fastener for securing the position of the clamp block along the rail, the fastener including a mating opposing surface facing the mating angled surface of the clamp block, wherein the mating opposing surface of the fastener is configured to mate with the opposing surface of the rail when the mating angled surface of the clamp block is mated with the angled surface of the rail, wherein tightening the fastener bears the mating opposing surface of the fastener against the opposing surface of the rail and draws the mating angled surface of the clamp block towards the angled surface of the rail such that the upwardly angled surface of the clamp block is pulled against and forced into abutment with the complimentary downwardly angled surface of the rail and the downwardly angled surface of the rail slides the clamp block downward and holds the clamp block against the track, wherein loosening the fastener allows the clamp block to be slid along the track and loosening the fastener further such that the mating angled surface of the clamp block can clear the angled surface of the rail allows the clamp block to be lifted off the rail at any position along the rail; and
    a fence for guiding a workpiece into the material removal tool attached to the clamp block.

2. A universal machinery fence system as in claim 1, wherein the rail is U-shaped for mounting to a side surface of the work table.

3. A universal machinery fence system as in claim 1, wherein the rail is T-shaped for mounting to a corner of the work table.

4. A universal machinery fence system as in claim 1, wherein the rail is adapted for mounting to the bottom of a table.

5. A universal machinery fence system as in claim 1, wherein the rail has a T-slot in an upper surface of the rail.

6. A universal machinery fence system as in claim 1, wherein the rail has a T-slot in a bottom surface of the rail.

7. A universal machinery fence system as in claim 1, wherein the fence is L-shaped with T-slots on top and front faces of the fence.

8. A universal machinery fence system as in claim 1, wherein the rail has a ruler on a top surface and the clamp block mounts a magnifier through which demarcations on the ruler can be viewed.

9. A universal machinery fence system as in claim 1, further comprising a curved saw guide that can be mounted to a working face of the fence, having a curved surface that extends generally parallel to the material removal tool in the direction the material removal tool extends and in the direction of feed of the workpiece, the curved surface curves so as to permit repositioning of the workpiece in the feed direction by angling it against the curved surface of the guide.

10. A universal machinery fence system as in claim 1, wherein rails are provided on both sides of the work table that are parallel and spaced apart from one another and wherein the clamp block is one of a pair of clamp blocks assembled to each rail with the fence spanning the clamp block.

11. A universal machinery fence system as in claim 1, further comprising:
an adapter mount fastened to the clamp block, wherein the fence is releasably assembled to the clamp block via the adapter mount, wherein the adapter mount forms two slots spaced apart in a first direction that is parallel to the fence, wherein the two slots run completely through the adapter mount in a direction generally perpendicular to the fence, wherein the two slots are open at the ends of the two slots that are opposite to the clamp block; and
two fasteners extending from the fence and completely through the two slots in the direction generally perpendicular to the fence to secure the fence to the adapter mount, wherein one of the two fasteners extends through each of the two slots, wherein loosening the two fasteners allows the rail to be lifted with the two fasteners from the adapter mount by sliding the two fasteners out the open ends of the slots opposite to the clamp block.

12. A universal machinery fence system as in claim 11, wherein the adapter mount is secured to the clamp block with threaded fasteners that are threaded into the clamp block and at least one of the threaded fasteners extends through a round hole in the adapter mount that is oversized relative to the threaded fastener so that the fence can be either angled to extend perpendicular to the rail or it can be angled to extend at an angle to the rail.

13. A universal machinery fence system as in claim 11, wherein the fasteners each include a bolt wherein heads of the bolts are received in a T-slot in the back of the fence.

14. A universal machinery fence system as in claim 11, wherein the fence is L-shaped and can be assembled to the adapter mount in any of a number of orientations, including one in which a long leg of the L is vertical and another in which a short leg of the L is vertical.

15. A universal machinery fence system as in claim 11, wherein the two slots of the adapter mount are each formed from two finger like projections that run parallel to each other.

16. A universal machinery fence system as in claim 1, wherein the fence runs generally perpendicular to the rail.

17. A universal machinery fence system as in claim 1, wherein the fastener includes a cam lever.

18. A universal machinery fence system as in claim 1, further comprising:
the work table, wherein the rail is attached to the work table; and
the material removal tool.

19. A universal machinery fence system as in claim 18, wherein the material removal tool includes a table saw.

20. A universal machinery fence system as in claim 18, wherein the material removal tool includes a band saw.

21. A universal machinery fence system as in claim 18, wherein the material removal tool includes a shaper.

22. A universal machinery fence system as in claim 18, wherein the material removal tool includes a router and the work table includes a router table.

23. A universal machinery fence system as in claim 18, wherein the material removal tool includes a mortiser.

24. A universal machinery fence system as in claim 1, further comprising a leveling screw for adjusting an angle of the fence relative to the material removal tool, wherein the leveling screw is threaded into the clamp block and seated against the rail.

25. A universal machinery fence system as in claim 24, wherein the leveling screw is a first leveling screw, further comprising a second leveling screw, wherein the second leveling screw is threaded into the clamp block and seated against the rail, wherein the first leveling screw and the second leveling screw are on opposite sides of the fastener.

26. A universal machinery fence system as in claim 24, wherein the leveling screw comprises nylon.

27. A universal machinery fence system as in claim 1, wherein the fence includes an angled surface that faces downwardly and extends the length of the fence.

28. A universal machinery fence system as in claim 1, wherein the profile of the angled surface and the profile of the mating angled surface are substantially flat.

* * * * *